US011218572B2

(12) United States Patent
Qi et al.

(10) Patent No.: US 11,218,572 B2
(45) Date of Patent: Jan. 4, 2022

(54) PACKET PROCESSING BASED ON LATENCY SENSITIVITY

(71) Applicant: Huawei Technologies Co., Ltd., Shenzhen (CN)

(72) Inventors: Yunlei Qi, Dongguan (CN); Chunrong Li, Dongguan (CN); Yongjian Hu, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 58 days.

(21) Appl. No.: 16/539,542

(22) Filed: Aug. 13, 2019

(65) Prior Publication Data

US 2019/0373086 A1 Dec. 5, 2019

Related U.S. Application Data

(63) Continuation of application No. PCT/CN2017/109365, filed on Nov. 3, 2017.

(30) Foreign Application Priority Data

Feb. 17, 2017 (CN) .......................... 201710087163.1

(51) Int. Cl.
H04L 29/06 (2006.01)
H04L 12/931 (2013.01)
(Continued)

(52) U.S. Cl.
CPC ............ H04L 69/166 (2013.01); H04L 49/20 (2013.01); H04L 49/9021 (2013.01);
(Continued)

(58) Field of Classification Search
CPC ... H04L 69/166; H04L 49/20; H04L 49/9021; H04L 49/9057; H04L 69/14;
(Continued)

(56) References Cited

U.S. PATENT DOCUMENTS 9,262,554 B1 * 2/2016 Bailey ............... G06F 16/90344
10,454,626 B2 * 10/2019 Chu ....................... H04L 1/1825
(Continued)

FOREIGN PATENT DOCUMENTS

CN 1188991 C 2/2005
CN 100518134 C 7/2009
(Continued)

OTHER PUBLICATIONS

Huawei, "RAN configuration of network slices," R3-161135, RAN WG3 Meeting #92, Nanjing, China, May 23-27, 2016, 5 pages.
(Continued)

Primary Examiner — Mounir Moutaouakil
(74) Attorney, Agent, or Firm — Conley Rose, P.C.

(57) ABSTRACT

A packet processing method includes: obtaining, at a Medium Access Control (MAC) layer, a first fragmented data frame included in a first data frame; buffering the first fragmented data frame into a first queue; obtaining, at the MAC layer, a second fragmented data frame included in a second data frame; buffering the second fragmented data frame into a second queue; sending the first fragmented data frame to a forwarding processing module; obtaining first forwarding information using the forwarding processing module; sending the second fragmented data frame to the forwarding processing module after sending the first fragmented data frame to the forwarding processing module; and obtaining second forwarding information.

20 Claims, 18 Drawing Sheets

(51) Int. Cl.
*H04L 12/883* (2013.01)
*H04L 12/861* (2013.01)
*H04L 29/08* (2006.01)

(52) U.S. Cl.
CPC .......... *H04L 49/9057* (2013.01); *H04L 69/14* (2013.01); *H04L 69/324* (2013.01)

(58) Field of Classification Search
CPC . H04L 69/324; H04L 47/365; H04L 47/6275; H04L 47/6295; H04L 47/56; H04L 47/17; H04L 47/24; H04L 47/622; H04L 49/90; H04L 49/9036; H04L 49/9015; H04L 49/109; H04L 45/566; H04L 49/9042; H04L 47/52; H04L 45/60; H04L 49/901; H04L 2012/5681
See application file for complete search history.

(56) References Cited

U.S. PATENT DOCUMENTS

| | | | | |
|---|---|---|---|---|
| 10,797,910 | B2* | 10/2020 | Boutros | H04L 47/125 |
| 2004/0039833 | A1 | 2/2004 | Ludwig et al. | |
| 2004/0073694 | A1* | 4/2004 | Frank | H04L 47/10 709/232 |
| 2004/0218592 | A1* | 11/2004 | Nagar | H04L 49/90 370/381 |
| 2005/0286526 | A1* | 12/2005 | Sood | H04L 49/9094 370/394 |
| 2007/0174411 | A1* | 7/2007 | Brokenshire | G06F 15/17337 709/213 |
| 2011/0158124 | A1* | 6/2011 | Frailong | H04L 49/9047 370/253 |
| 2012/0039173 | A1* | 2/2012 | Danzig | H04L 47/52 370/235.1 |
| 2013/0346837 | A1 | 12/2013 | Mitsuhashi | |
| 2014/0281083 | A1* | 9/2014 | Canepa | G06F 13/364 710/112 |
| 2015/0016462 | A1 | 1/2015 | Zhou | |
| 2015/0124835 | A1* | 5/2015 | McCanne | H04L 47/2441 370/412 |
| 2016/0100421 | A1* | 4/2016 | Ding | H04L 1/1621 370/336 |
| 2016/0103783 | A1* | 4/2016 | Allen | H04L 67/104 709/212 |
| 2016/0294735 | A1* | 10/2016 | Panchagnula | H04L 49/9005 |
| 2017/0063509 | A1* | 3/2017 | Kim | H04L 5/0055 |
| 2017/0147251 | A1* | 5/2017 | Lu | H04L 49/901 |
| 2017/0149536 | A1* | 5/2017 | Chu | H04L 27/26 |
| 2018/0159802 | A1* | 6/2018 | Bao | H04L 45/60 |

FOREIGN PATENT DOCUMENTS

| | | |
|---|---|---|
| CN | 101729407 A | 6/2010 |
| CN | 101989954 A | 3/2011 |
| CN | 102014067 A | 4/2011 |
| CN | 102065012 A | 5/2011 |
| CN | 102546417 A | 7/2012 |
| CN | 103546374 A | 1/2014 |
| CN | 105162724 A | 12/2015 |
| CN | 105406978 A | 3/2016 |
| JP | 2007288491 A | 11/2007 |
| JP | 2014007501 A | 1/2014 |
| WO | 2006083965 A2 | 8/2006 |
| WO | 2009097716 A1 | 8/2009 |
| WO | 2017016505 A1 | 2/2017 |

OTHER PUBLICATIONS

Huawei, "Support for Ultra-reliable low latency communication," R3-161136, 3GPP TSG-RAN3 Meeting #92 Nanjing, China, May 23-27, 2016, 2 pages.
Machine Translation and Abstract of Chinese Publication No. CN105406978, Mar. 16, 2016, 45 pages.
Machine Translation and Abstract of Chinese Publication No. CN105162724, Dec. 16, 2015, 32 pages.
Machine Translation and Abstract of International Publication No. WO2009097716, Aug. 13, 2009, 25 pages.
Machine Translation and Abstract of Chinese Publication No. CN101989954, Mar. 23, 2011, 19 pages.
Machine Translation and Abstract of Chinese Publication No. CN102546417, Jul. 4, 2012, 13 pages.
Machine Translation and Abstract of Chinese Publication No. CN102014067, Apr. 13, 2011, 13 pages.
Machine Translation and Abstract of Chinese Publication No. CN102065012, May 18, 2011, 20 pages.
Machine Translation and Abstract of Chinese Publication No. CN100518134, Jul. 22, 2009, 9 pages.
Machine Translation and Abstract of Chinese Publication No. CN101729407, Jun. 9, 2010, 23 pages.
Foreign Communication From a Counterpart Application, Chinese Application No. 201710087163.1, Chinese Office Action dated Dec. 13, 2019, 5 pages.
Foreign Communication From a Counterpart Application, European Application No. 17896756.8, Extended European Search Report dated Nov. 26, 2019 8 pages.
Foreign Communication From a Counterpart Application, PCT Application No. PCT/CN2017/109365, English Translation of International Search Report dated Jan. 24, 2018, 3 pages.
Foreign Communication From a Counterpart Application, PCT Application No. PCT/CN2017/109365, English Translation of Written Opinion dated Jan. 24, 2018, 4 pages.

* cited by examiner

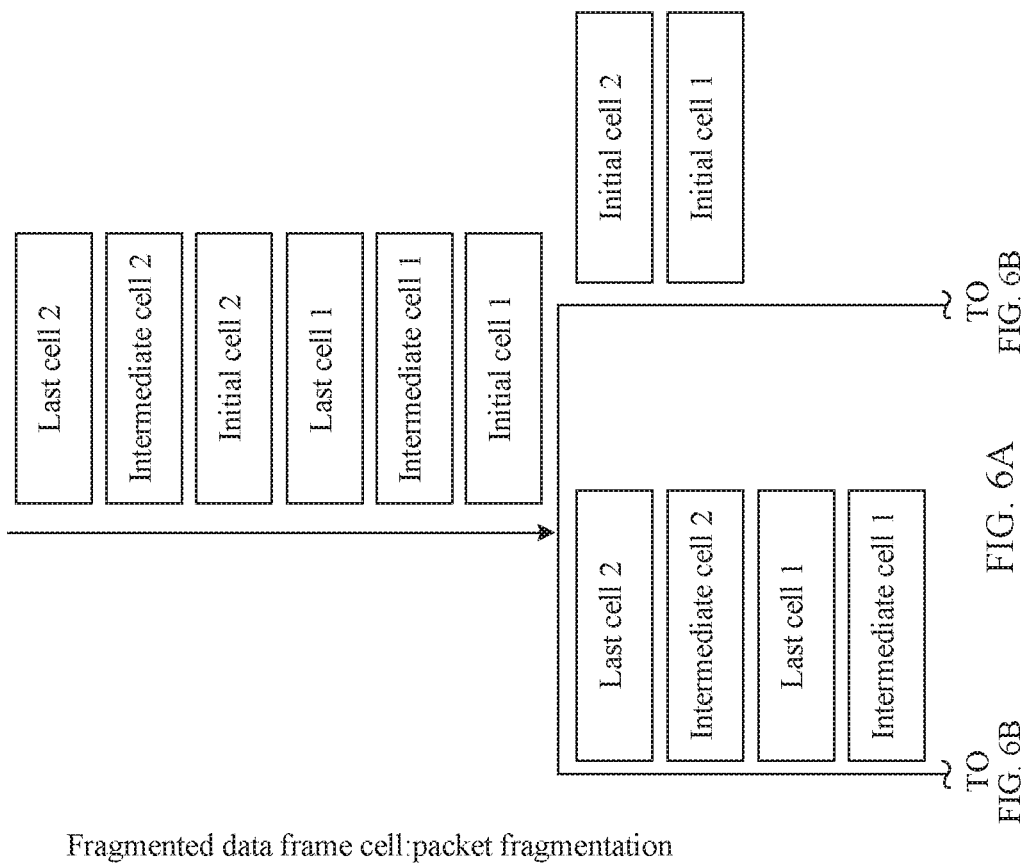
Fragmented data frame cell:packet fragmentation

First fragment (initial fragmented data frame)

| | |
|---|---|
| Preamble | 7 |
| SFD-E-FL | 1 (data frame that carries a latency-sensitive label) |
| DMAC | 6 |
| SMAC | 6 |
| Ethertype | 2 |
| Data | n |
| FCS | 4 |

| | |
|---|---|
| Preamble | 7 |
| SFD-E-F | 1 (initial fragmented data frame that carries a latency-sensitive label) |
| Home Device ID | 2 (device identifier) |
| Home Port ID | 2 (port identifier) |
| Home Frame ID | 2 (data frame identifier) |
| DMAC | 6 |
| SMAC | 6 |
| Ethertype | 2 |
| Data | n |
| CELL-FCS | 4 |

CONT. FROM FIG. 7A

Intermediate Fragment (intermediate fragmented data frame)

| | |
|---|---|
| Preamble | 7 |
| SFD-E-I | 1 (intermediate fragmented data frame that carries a latency-sensitive label) |
| Home Device ID | 2 |
| Home Port ID | 2 |
| Home Frame ID | 2 |
| Fragcount | 1 (fragment sequence number) |
| Data | n |
| CELL-FCS | 4 |

Last Fragment (last fragmented data frame)

| | |
|---|---|
| Preamble | 7 |
| SFD-E-L | 1 (last fragmented data frame that carries a latency-sensitive label) |
| Home Device ID | 2 |
| Home Port ID | 2 |
| Home Frame ID | 2 |
| Data | n |
| FCS | 4 |

FIG. 7B (fragmented data frame check sequence)

| Preamble | SFD-N-FL | DMAC | SMAC | Ethertype | Data | FCS |
|---|---|---|---|---|---|---|
| 7 | 1 | 6 | 6 | 2 | n | 4 |

(data frame that carries a latency-insensitive label)

CONT. FROM FIG. 7A

First Fragment

| Preamble | SFD-N-F | Home Device ID | Home Port ID | Home Frame ID | DMAC | SMAC | Ethertype | Data | CELL-FCS |
|---|---|---|---|---|---|---|---|---|---|
| 7 | 1 | 2 | 2 | 2 | 6 | 6 | 2 | n | 4 |

(initial fragmented data frame that carries a latency-insensitive label)

Intermediate Fragment

| Preamble | SFD-N-I | Home Device ID | Home Port ID | Home Frame ID | Fragcount | Data | CELL-FCS |
|---|---|---|---|---|---|---|---|
| 7 | 1 | 2 | 2 | 2 | 1 | n | 4 |

(intermediate fragmented data frame that carries a latency-insensitive label)

Last Fragment

| Preamble | SFD-N-L | Home Device ID | Home Port ID | Home Frame ID | Data | FCS |
|---|---|---|---|---|---|---|
| 7 | 1 | 2 | 2 | 2 | n | 4 |

(last fragmented data frame that carries a latency-insensitive label)

FIG. 7C

PACKET PROCESSING BASED ON LATENCY SENSITIVITY

CROSS-REFERENCE TO RELATED APPLICATIONS

This application is a continuation of International Patent Application No. PCT/CN2017/109365, filed on Nov. 3, 2017, which claims priority to Chinese Patent Application No. 201710087163.1, filed on Feb. 17, 2017. The disclosures of the aforementioned applications are hereby incorporated by reference in their entireties.

TECHNICAL FIELD

This application relates to the field of communications technologies, and in particular, to a packet processing method and apparatus.

BACKGROUND

With emergence of new types of 5G latency-sensitive services such as self-driving, telemedicine, virtual reality, tactile Internet, and an ultra-high definition video, a requirement that an end-to-end latency does not exceed 1 millisecond (ms) is proposed for an operator's network. For a single packet forwarding device, a requirement of a microsecond (μs) level ultra-low latency needs to be met. A conventional packet transport network cannot meet the requirement of the microsecond level ultra-low latency, and forwarding time of a data packet in a single packet forwarding device needs to be reduced.

A conventional packet forwarding device usually supports two forwarding manners: store-and-forward and cut-through switching. The store and forward manner requires that data is sent to a destination port only after a complete packet is received, and therefore, a forwarding rate is low, and a forwarding latency is long. However, the cut-through manner requires that data may be sent to a destination port after a destination address of a packet is obtained, and therefore, a forwarding rate is high, and a forwarding latency is short. Although the forwarding latency can be greatly reduced in the cut-through manner, forwarding is performed on a per-packet basis, like the store and forward manner. In a traffic convergence scenario, forwarding of a current packet cannot start until a previous packet is wholly sent. When a length of the previous packet is relatively great, forwarding waiting time of the current packet is increased. Therefore, for a latency-sensitive service, it is difficult for the foregoing two forwarding manners to meet a requirement of ultra-low latency forwarding. Further, to reduce a packet forwarding latency, an existing data transmission technology uses a complete data fragmenting and packaging method for sending. However, an existing data transmission technology is performing fragmenting transmission on a data packet at a network layer. Therefore, for a packet forwarded only at a layer 2 (for example, a data link layer), a forwarding latency of the packet cannot be reduced.

SUMMARY

An objective of embodiments of this application is to provide a packet processing method and apparatus, to resolve a problem that an ultra-low latency forwarding requirement cannot be met because a forwarding latency of a latency-sensitive service is relatively long.

The objective of the embodiments of the present disclosure is implemented using the following technical solutions.

According to a first aspect, a packet processing method is provided, and the method includes: obtaining, by a first network device at a Medium Access Control (MAC) layer, a first fragmented data frame included in a first data frame, buffering the first fragmented data frame into a first queue, obtaining, at the MAC layer, a second fragmented data frame included in a second data frame, and buffering the second fragmented data frame into a second queue, where the first queue is a latency-sensitive queue, and the second queue is a latency-insensitive queue; and sending, by the first network device, the first fragmented data frame to a forwarding processing module, and obtaining first forwarding information using the forwarding processing module; and after the first network device sends the first fragmented data frame to the forwarding processing module, sending the second fragmented data frame to the forwarding processing module, and obtaining second forwarding information using the forwarding processing module, where the first forwarding information is forwarding information of the first data frame, and the second forwarding information is forwarding information of the second data frame, where the latency-sensitive queue is used to store a fragmented data frame of the latency-sensitive service, and a latency-insensitive queue is used to store a fragmented data frame of a latency-insensitive service.

Therefore, in the method provided in this embodiment of this application, it can be effectively ensured at the MAC layer that a latency-sensitive service is sent to the forwarding processing module prior to a latency-insensitive service, thereby effectively reducing a forwarding latency of the latency-sensitive service in a network device and ensuring that the latency-sensitive service is not affected by a latency-insensitive service whose data frame has a relatively great length. Further, according to the method provided in this application, fragmenting and forwarding are performed on a data frame at the MAC layer, thereby effectively ensuring a forwarding latency of a layer 2-forwarded packet in the network device. In addition, because fragmenting and forwarding are performed at the MAC, for a packet (for example, an Internet Protocol (IP) packet) forwarded by a layer 3 (for example, a network layer), an ultra-low latency forwarding requirement can also be met.

In a possible design, the obtaining, by a first network device at a MAC layer, a first fragmented data frame included in a first data frame includes: receiving, by the first network device using a first ingress MAC port, the first fragmented data frame that carries a latency-sensitive label.

Therefore, in the method provided in this embodiment of this application, the first network device can directly receive the first fragmented data frame, namely, an incomplete data frame, and identify the latency-sensitive label carried in the first fragmented data frame, to reduce a forwarding latency of the latency-sensitive service in the network device.

In a possible design, the obtaining, by a first network device at a MAC layer, a first fragmented data frame included in a first data frame includes: receiving, by the first network device, the first data frame using a first ingress MAC port, and fragmenting the first data frame to obtain the first fragmented data frame, where according to a specified rule, the first ingress MAC port is configured to be bound to receive a latency-sensitive data frame.

Therefore, in the method provided in this embodiment of this application, the first network device receives the first data frame, namely, a complete data frame, and has a function of fragmenting a data frame. By fragmenting the data frame, the first network device obtains a fragmented data frame, to effectively reduce a forwarding latency and accelerate time during which the network device processes the data frame.

In a possible design, the first fragmented data frame includes a latency-sensitive label.

Therefore, in the method provided in this embodiment of this application, an ingress module of the network device can add a latency-sensitive label to the first fragmented data frame, to help a subsequent module identify the fragmented data frame as a latency-sensitive service as soon as possible, and reduce a forwarding latency.

In a possible design, the performing, by the first network device, fragmenting processing on the first data frame to obtain the first fragmented data frame includes: when the first network device determines that a length of the first data frame is greater than or equal to a first preset threshold, reading the first data frame based on a first preset packet length to obtain an initial fragmented data frame of the first data frame, where the initial fragmented data frame of the first data frame carries an initial fragmented data frame identifier and a fragmented data frame home identifier; further, after obtaining the initial fragmented data frame, determining, by the first network device, whether a length of remaining data of the first data frame is greater than or equal to a second preset threshold; and when the length of the remaining data of the first data frame is greater than or equal to the second preset threshold, reading the remaining data of the first data frame based on a second preset packet length to obtain an intermediate fragmented data frame of the first data frame, where the intermediate fragmented data frame of the first data frame carries an intermediate fragmented data frame identifier and the fragmented data frame home identifier; or when the length of the remaining data of the first data frame is less than the second preset threshold, using the remaining data of the first data frame as a last fragmented data frame of the first data frame, where the last fragmented data frame of the first data frame carries a last fragmented data frame identifier and the fragmented data frame home identifier, where the first fragmented data frame is the initial fragmented data frame of the first data frame, or the first fragmented data frame is the intermediate fragmented data frame of the first data frame, or the first fragmented data frame is the last fragmented data frame of the first data frame.

After the first network device obtains a first intermediate fragmented data frame, a length of remaining data of the first data frame may still be greater than or equal to a second preset threshold. Therefore, one intermediate fragmented data frame may continue to be obtained based on the foregoing method. In other words, there may be a plurality of intermediate fragmented data frames. Therefore, when the length of the first data frame is relatively great, the first network device may obtain a plurality of fragmented data frames by fragmenting the first data frame, to effectively reduce forwarding waiting time and improve system forwarding efficiency.

In a possible design, when a quantity of intermediate fragmented data frames is greater than or equal to 1, the intermediate fragmented data frame further carries a fragment sequence number, to help an egress module reassemble fragmented data frames, and effectively reduce a forwarding latency.

In a possible design, the intermediate fragmented data frame of the first data frame carries a fragment sequence number, and reassembling all fragmented data frames included in the first data frame to obtain a reassembled first data frame includes: reassembling, based on a fragment sequence number carried in an intermediate fragmented data frame of each first data frame, an initial fragmented data frame of the first data frame, all intermediate fragmented data frames included in the first data frame, and a last fragmented data frame of the first data frame, to obtain the reassembled first data frame.

Therefore, the intermediate fragmented data frames can be quickly reassembled based on the fragment sequence number, and then an initial fragmented data frame and a last fragmented data frame that have a same fragmented data frame home identifier and the reassembled intermediate fragmented data frame are reassembled, to obtain the reassembled first data frame, thereby effectively reducing a forwarding latency.

In a possible design, the obtaining first forwarding information using the forwarding processing module includes: when the forwarding processing module determines that the first fragmented data frame is the initial fragmented data frame of the first data frame, obtaining frame information carried in the first fragmented data frame, querying a data frame forwarding information table based on the frame information, to obtain first forwarding information, and adding the first forwarding information to a fragmented data frame forwarding information table; or when the forwarding processing module determines that the first fragmented data frame is not the initial fragmented data frame of the first data frame, querying a fragmented data frame forwarding information table using the fragmented data frame home identifier carried in the first fragmented data frame as a keyword, to obtain first forwarding information.

In a possible design, for a non-initial fragmented data frame, obtaining the first forwarding information using the forwarding processing module may include but is not limited to the following two forms.

Form 1: The fragmented data frame forwarding information table stores the first forwarding information and the fragmented data frame home identifier, and when determining that the first fragmented data frame is not the initial fragmented data frame of the first data frame, the forwarding processing module directly queries the fragmented data frame forwarding information table using the fragmented data frame home identifier carried in the first fragmented data frame as a keyword, to obtain the first forwarding information.

Form 2: The fragmented data frame forwarding information table stores only the first forwarding information, and the first network device stores a mapping relationship between a fragmented data frame home identifier and first forwarding information independently, and in this case, the fragmented data frame home identifier is used as a keyword of an index, and the corresponding first forwarding information in the fragmented data frame forwarding information table is determined based on the keyword, to further obtain the first forwarding information.

Therefore, because the complex data frame forwarding information table does not need to be queried for the non-initial fragmented data frame, a table query latency can be greatly reduced, and forwarding efficiency can be improved.

In a possible design, the forwarding processing module sends, to an egress module of the first network device, a fragmented data frame in a latency-sensitive queue corresponding to the forwarding processing module prior to a fragmented data frame in the latency-insensitive queue corresponding to the forwarding processing module.

In a possible design, after the obtaining first forwarding information, the method further includes: transparently transmitting, by the first network device, the first fragmented data frame to a second network device based on the first forwarding information.

Therefore, in the method provided in this embodiment of this application, a fragmented data frame is used as a granularity, and a fragmented data frame is sent to a next hop device using a transparent transmission method, to greatly reduce a forwarding latency and improve forwarding efficiency.

In a possible design, after the obtaining first forwarding information, the method further includes: buffering the first fragmented data frame; and after the first network device determines that all fragmented data frames included in the first data frame are buffered, reassembling all the fragmented data frames included in the first data frame to obtain a reassembled first data frame, and sending the reassembled first data frame to the second network device based on the first forwarding information.

Therefore, in the method provided in this embodiment of this application, a complete data frame is used as a granularity, to adapt to a scenario in which the second network device cannot process a fragmented data frame, and to reduce a forwarding latency.

In a possible design, the obtaining, by the first network device at the MAC layer, a second fragmented data frame included in a second data frame includes: receiving, by the first network device using a second ingress MAC port, the second fragmented data frame that carries a latency-insensitive label.

Therefore, in the method provided in this embodiment of this application, the first network device can directly receive the second fragmented data frame, namely, an incomplete data frame, and identify the latency-insensitive label carried in the second fragmented data frame, to effectively reduce a forwarding latency of the latency-sensitive service in the network device.

In a possible design, the obtaining, by the first network device at the MAC layer, a second fragmented data frame included in a second data frame includes: receiving, by the first network device, the second data frame using a second ingress MAC port, and fragmenting the second data frame to obtain the second fragmented data frame.

Therefore, in the method provided in this embodiment of this application, the first network device receives the second data frame, namely, a complete data frame, and has a function of fragmenting a data frame. By fragmenting the data frame, the first network device obtains a fragmented data frame, to effectively reduce a forwarding latency and accelerate time during which the network device processes the data frame.

In a possible design, the second forwarding information includes latency-sensitive indication information, and the latency-sensitive indication information is used to indicate whether a latency-sensitive label is added to the second fragmented data frame.

Therefore, in the method provided in this embodiment of this application, a service type of a currently transmitted data frame can be determined using forwarding information, and after it is determined that the data frame is a latency-sensitive service, a forwarding latency can be effectively reduced.

According to a second aspect, an embodiment of this application provides a packet processing apparatus, configured to perform the method in the first aspect or any possible implementation of the first aspect. The apparatus includes modules configured to perform the method according to the first aspect or any possible implementation of the first aspect.

According to a third aspect, this application provides a network device, where the network device includes a communications interface, a processor, and a memory. The communications interface, the processor, and the memory may be connected using a bus system. The memory is configured to store a program, an instruction, or code. The processor is configured to execute the program, the instruction, or the code in the memory, to perform the method in the first aspect or any possible implementation of the first aspect.

According to a fourth aspect, an embodiment of this application provides a computer readable storage medium or a computer program product, configured to store a computer program, and the computer program includes an instruction for performing the method in the first aspect or any possible implementation of the first aspect.

BRIEF DESCRIPTION OF DRAWINGS

FIG. 6A and FIG. 6B are second schematic diagrams of obtaining forwarding information from different fragmented data frames according to an embodiment of this application;

FIG. 7A, FIG. 7B, and FIG. 7C are schematic structural diagrams of each field in a fragmented data frame according to an embodiment of this application;

DESCRIPTION OF EMBODIMENTS

The following describes the embodiments of this application with reference to accompanying drawings.

Figure 1:
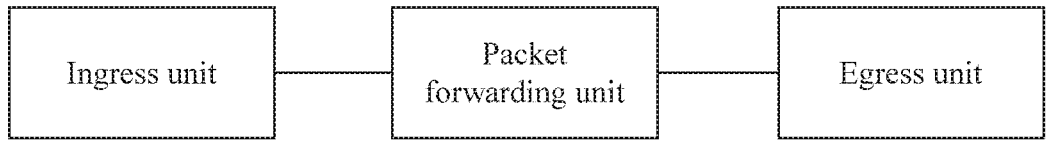
FIG. 1 shows a forwarding architecture of a conventional packet forwarding device according to an embodiment of this application.

Referring to FIG. 1, a forwarding architecture of a conventional packet forwarding device includes the following units: an ingress unit, a packet forwarding unit, and an egress unit.

The ingress unit receives packets using a plurality of ingress Medium Access Control (MAC) ports, and then sequentially sends the received packets to the packet forwarding unit. The packet forwarding unit queries a packet forwarding table specific to each packet to determine corresponding forwarding information, and sends the packet to the egress unit. The egress unit allocates the corresponding packet to a corresponding egress MAC port based on forwarding information corresponding to each packet, and sends the corresponding packet to a next hop device using the egress MAC port.

It can be learned from the foregoing description that the conventional packet forwarding device performs forwarding processing at a MAC layer on a per-packet basis, without considering a specific service type. For example, whether the packet is a latency-sensitive service is not considered. Therefore, in other approaches, forwarding of a next packet cannot start until a current packet is wholly sent. If a packet length of the current packet is relatively great, forwarding waiting time of the next packet is necessarily increased. In particular, it is difficult for the foregoing forwarding mode to meet a requirement of ultra-low latency forwarding of the latency-sensitive service.

Figure 2:
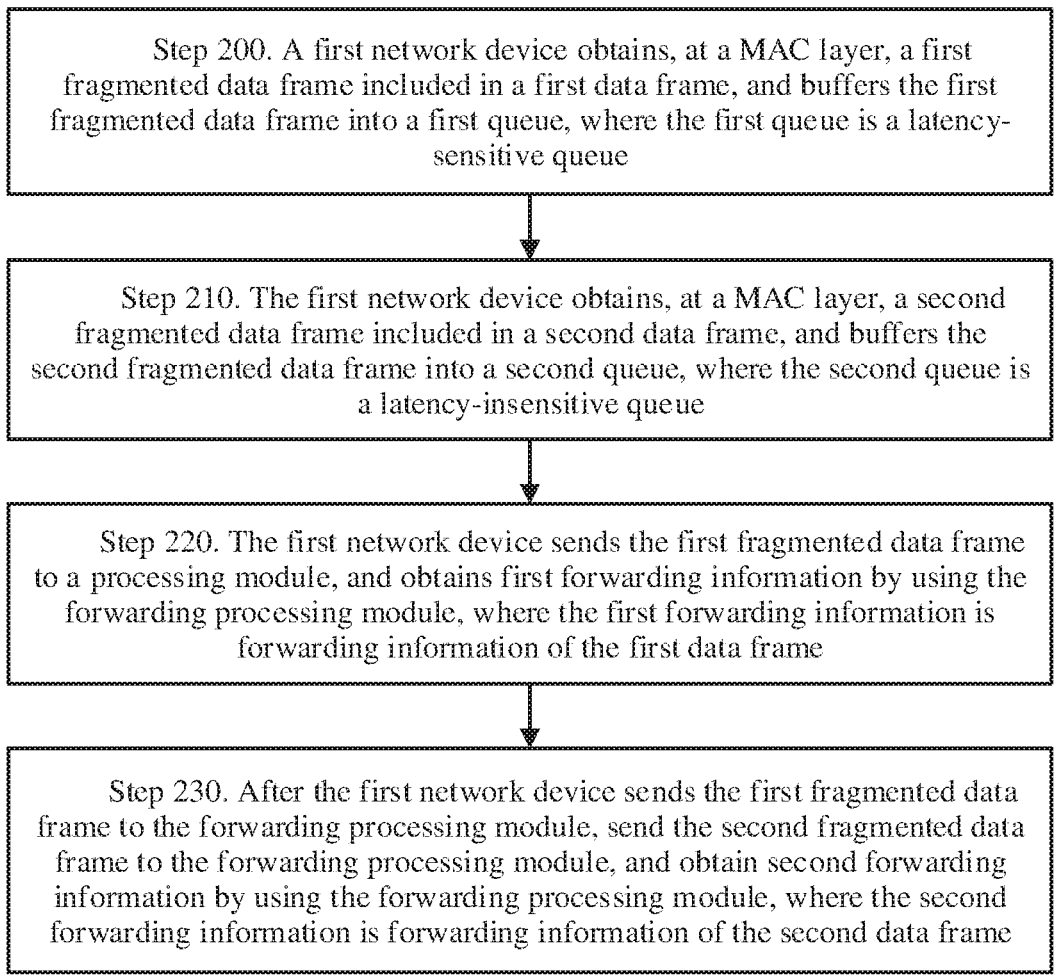
FIG. 2 is an overview flowchart of a packet processing method according to an embodiment of this application.

Therefore, referring to FIG. 2, this application provides a packet processing method, to resolve a problem that a requirement of ultra-low latency forwarding cannot be met because a forwarding latency of a latency-sensitive service is relatively long, and the method includes the following steps.

Step 200: A first network device obtains, at a MAC layer, a first fragmented data frame included in a first data frame, and buffers the first fragmented data frame into a first queue, where the first queue is a latency-sensitive queue.

Step 210: The first network device obtains, at the MAC layer, a second fragmented data frame included in a second data frame, and buffers the second fragmented data frame into a second queue, where the second queue is a latency-insensitive queue.

Step 220: The first network device sends the first fragmented data frame to a forwarding processing module, and obtains first forwarding information using the forwarding processing module, where the first forwarding information is forwarding information of the first data frame.

Step 230: After the first network device sends the first fragmented data frame to the forwarding processing module, send the second fragmented data frame to the forwarding processing module, and obtain second forwarding information using the forwarding processing module, where the second forwarding information is forwarding information of the second data frame.

It should be understood that, in step 200 and step 210, the method in which the first network device obtains the fragmented data frame at the MAC layer is different from a method for fragmenting a data frame at an IP layer (namely, a layer 3) in other approaches, and is intended to effectively reduce a forwarding latency of the data frame at the MAC layer.

It should be understood that a sequence of performing step 200 and step 210 is not limited in this application. When the first fragmented data frame and the second fragmented data frame are respectively from different ports, step 200 and step 210 may be performed simultaneously; or when the first fragmented data frame and the second fragmented data frame are from a same port, an execution sequence of step 200 and step 210 is determined based on an arrival sequence of the first fragmented data frame and the second fragmented data frame.

The latency-sensitive queue is used to store a fragmented data frame of the latency-sensitive service, and a latency-insensitive queue is used to store a fragmented data frame of a latency-insensitive service.

When step 200 is performed, methods in which the first network device obtains, at the MAC layer, the first fragmented data frame included in the first data frame may include but are not limited to the following two methods.

Method 1: The first network device receives, using a first ingress MAC port, the first fragmented data frame that carries a latency-sensitive label.

It may be learned from the first method that the first network device directly receives the first fragmented data frame, namely, an incomplete data frame, and the plurality of fragmented data frames included in the first data frame arrive at the first network device one by one. Herein, the first fragmented data frame is any fragmented data frame in the plurality of fragmented data frames included in the first data frame, and the first fragmented data frame carries the latency-sensitive label. In this case, fragmenting processing of the first data frame is completed by another device, and the plurality of fragmented data frames are obtained. The first network device has a capability of directly receiving and identifying a fragmented data frame.

Method 2: The first network device receives the first data frame using the first ingress MAC port, and performs fragmenting processing on the first data frame to obtain the first fragmented data frame, where according to a specified rule, the first ingress MAC port is configured to be bound to receive a latency-sensitive data frame.

It may be learned from the second method that the first network device receives the first data frame, namely, a complete data frame, and then performs fragmenting processing on the data frame to obtain the first fragmented data frame. Herein, the first fragmented data frame is any fragmented data frame in the plurality of fragmented data frames included in the first data frame.

It should be understood that if a length of the first data frame received by the first network device is relatively short (for example, less than 128 bytes), fragmenting processing may not be performed on the data frame, and the first data frame is buffered into the first queue.

In a possible design, the first network device performs fragmenting processing on the first data frame, and may further add the latency-sensitive label to the first fragmented data frame after obtaining the first fragmented data frame. Alternatively, before the first fragmented data frame is sent to a second device, the latency-sensitive label is added to the first fragmented data frame.

A method in which the first network device performs fragmenting processing on the first data frame to obtain the first fragmented data frame may include but is not limited to the following fragmenting processing method.

First, the first network device determines whether a length of the first data frame is greater than or equal to a first preset threshold.

When the length of the first data frame is less than the first preset threshold, fragmenting processing is not performed, and the first data frame is buffered into the first queue.

When the length of the first data frame is greater than or equal to the first preset threshold, the first data frame is read based on a first preset packet length to obtain an initial fragmented data frame of the first data frame, where the initial fragmented data frame of the first data frame carries an initial fragmented data frame identifier and a fragmented data frame home identifier.

Next, after obtaining the initial fragmented data frame, the first network device determines whether a length of remaining data of the first data frame is greater than or equal to a second preset threshold.

When the length of the remaining data of the first data frame is greater than or equal to the second preset threshold, the remaining data of the first data frame is read based on a second preset packet length to obtain an intermediate fragmented data frame of the first data frame, where the intermediate fragmented data frame of the first data frame carries an intermediate fragmented data frame identifier and the fragmented data frame home identifier; or when the length of the remaining data of the first data frame is less than the second preset threshold, the remaining data of the first data frame is used as a last fragmented data frame of the first data frame, where the last fragmented data frame of the first data frame carries a last fragmented data frame identifier and the fragmented data frame home identifier.

It should be understood that the second preset threshold may be the same as the first preset threshold, or may be different from the first preset threshold. Likewise, the second preset packet length may be the same as the first preset packet length, or may be different from the first preset packet length. Herein, the first preset packet length and the second preset packet length need to meet a criterion of a minimum packet length (for example, 64 bytes), encapsulation efficiency further needs to be considered, and padding is avoided as much as possible. In addition, the first preset packet length and the second preset packet length may be further flexibly configured based on different ports or a latency requirement of a service. For example, the minimum length of the preset packet length is not less than 64 bytes, and a maximum length of the preset packet length generally does not exceed 1500 bytes. For example, the maximum length may be approximately 1000 bytes. When the preset packet length is 200 bytes to 300 bytes, a forwarding latency can be effectively reduced and encapsulation efficiency is ensured.

It should be noted that after the first network device obtains a first intermediate fragmented data frame, in this case, a length of remaining data of the first data frame may still be greater than or equal to a second preset threshold, and therefore, one intermediate fragmented data frame may continue to be obtained based on the foregoing method. In other words, there may be a plurality of intermediate fragmented data frames. Therefore, when the length of the first data frame is relatively great, the first network device may obtain a plurality of fragmented data frames by fragmenting the first data frame, to effectively reduce forwarding waiting time and improve system forwarding efficiency.

For example, the first network device performs fragmenting processing on the first data frame, and may obtain the initial fragmented data frame and the last fragmented data frame, or may obtain the initial fragmented data frame, the intermediate fragmented data frame, and the last fragmented data frame, or may obtain the initial fragmented data frame, at least two intermediate fragmented data frames, and the last fragmented data frame.

In a possible design, the initial fragmented data frame identifier may be F (First), the intermediate fragmented data frame identifier may be I (Intermediate), and the last fragmented data frame identifier may be L (Last).

In a possible design, the fragmented data frame home identifier may include an identifier (for example, a Home Device ID) of a device that generates the fragmented data frame, an identifier (for example, a Home Port ID) of the ingress MAC port that receives a data frame, and a home data frame identifier (for example, a Home Frame ID).

In a possible design, the fragmented data frame home identifier may include a home data frame identifier, and in this case, the data frame identifier is a global data frame identifier.

For example, the fragmented data frame home identifier carried in the first fragmented data frame includes an ID of the first network device, an ID of the first ingress MAC port, and an ID of the first data frame.

In addition, in a possible design, when a quantity of intermediate fragmented data frames is greater than or equal to 1, the intermediate fragmented data frame further carries a fragment sequence number. For example, when the quantity of intermediate fragmented data frames is 3, a fragment sequence number carried in each intermediate fragmented data frame is used to indicate a sequence of obtaining a current intermediate fragmented data frame.

In a possible design, when the quantity of intermediate fragmented data frames is greater than 1, the intermediate fragmented data frame carries a fragment sequence number; or when the quantity of intermediate fragmented data frames is equal to 1, the intermediate fragmented data frame does not need to carry a fragment sequence number.

Likewise, when step 210 is performed, methods in which the first network device obtains, at the MAC layer, the second fragmented data frame included in the second data frame may include but are not limited to the following two methods.

Method 1: The first network device receives, using a second ingress MAC port, the second fragmented data frame that carries a latency-insensitive label.

Method 2: The first network device receives the second data frame using a second ingress MAC port, and performs fragmenting processing on the second data frame to obtain the second fragmented data frame.

It should be understood that if the second ingress MAC port is bound to receive only the latency-insensitive data frame, after fragmenting processing is performed on the second data frame to obtain the second fragmented data frame, the latency-insensitive label may be further added to the second fragmented data frame. If the second ingress MAC port is not bound to receive only the latency-insensitive data frame, the second ingress MAC port may receive the latency-sensitive data frame, or may receive the latency-insensitive data frame. Therefore, the second fragmented data frame that is obtained after fragmenting processing is performed on the second data frame is an unlabeled fragmented data frame, and a label to be carried cannot be determined, and needs to be specifically determined using the second forwarding information.

It should be noted that an execution process of step 210 is similar to that of step 200, and details are not repeatedly described. When the first ingress MAC port is not bound to receive only the latency-sensitive data frame, the first ingress MAC port and the second ingress MAC port may be a same port.

Figure 3A:
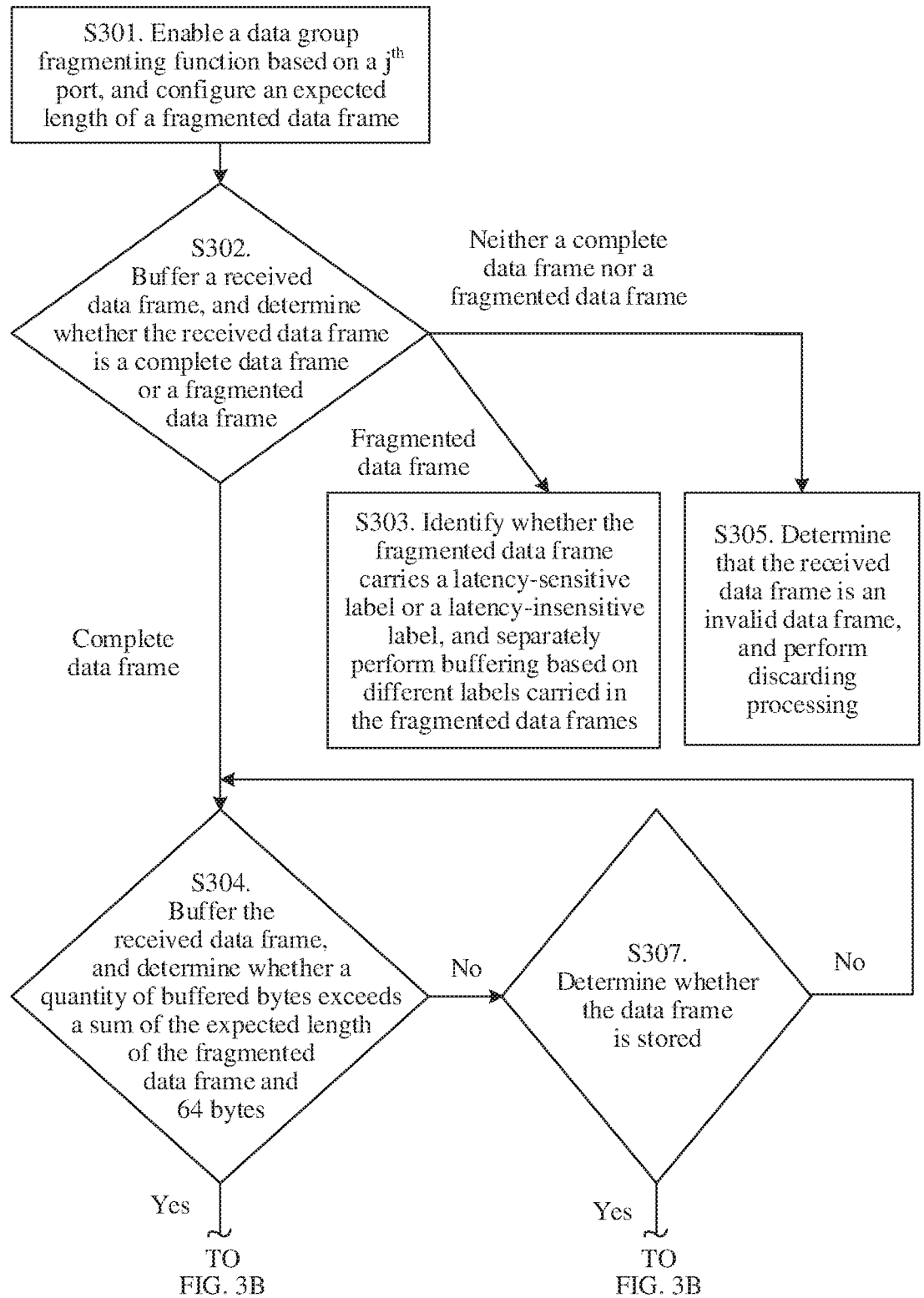
FIG. 3A and FIG. 3B are flowcharts of processing a received data frame by a network device according to an embodiment of this application.
Figure 3B:
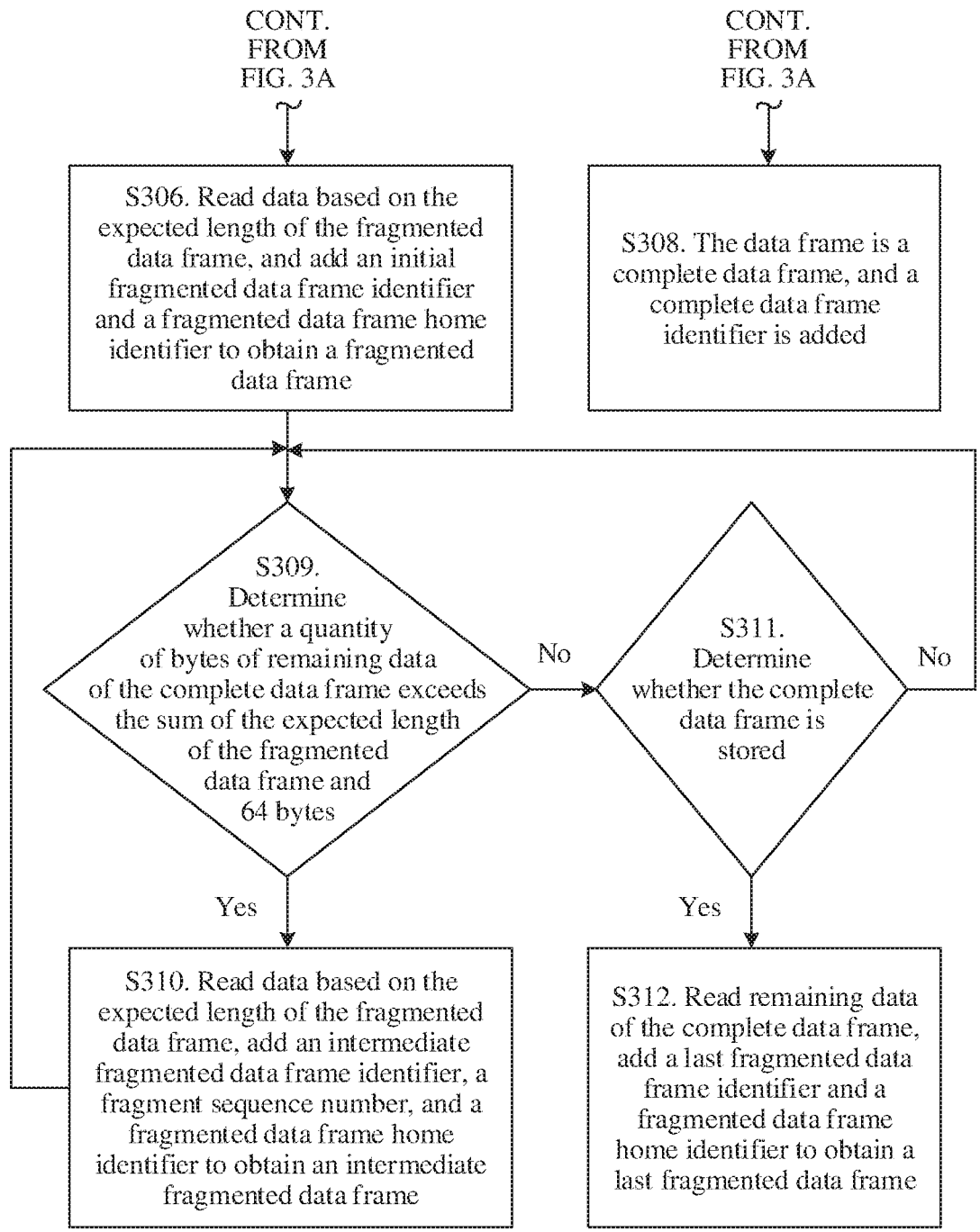

The following uses a $j^{th}$ ingress MAC port (a $j^{th}$ port for short) as an example. As shown in FIG. 3A and FIG. 3B, a process in which the first network device processes the received data frame is described.

S301. Enable a data frame fragmenting function based on the $j^{th}$ port, and configure an expected length of a fragmented data frame.

S302. Buffer a received data frame, and determine whether the received data frame is a complete data frame or the fragmented data frame, and if the received data frame is the fragmented data frame, perform step 303; or if the received data frame is the complete data frame, perform S304; otherwise, perform S305.

S303: Identify whether the fragmented data frame carries a latency-sensitive label or a latency-insensitive label, and separately perform buffering based on different labels carried in the fragmented data frames.

A fragmented data frame that carries the latency-sensitive label is buffered into a latency-sensitive queue corresponding to the $j^{th}$ port, and a fragmented data frame that carries a latency-insensitive label is buffered into a latency-insensitive queue corresponding to the port.

S304: Buffer the received complete data frame, and determine whether a quantity of buffered bytes exceeds a sum of the expected length of the fragmented data frame and 64 bytes. If the quantity of the buffered bytes exceeds the sum of the expected length of the fragmented data frame and 64 bytes, perform S306; otherwise, perform S307.

Herein, reserved 64 bytes are to ensure that a length of a subsequent fragmented data frame is not excessively short, encapsulation efficiency is considered, and padding is avoided as much as possible.

S305: Determine that the received data frame is an invalid data frame, and perform discarding processing.

S306: Read data based on the expected length of the fragmented data frame, and add an initial fragmented data frame identifier and a fragmented data frame home identifier, to obtain an initial fragmented data frame, and continue to perform step 309.

S307: Determine whether the complete data frame is stored, and if the complete data frame is stored, perform S308; otherwise, return to S304.

S308: Add a complete data frame identifier to the complete data frame.

S309: Determine whether a quantity of bytes of remaining data of the complete data frame exceeds the sum of the expected length of the fragmented data frame and 64 bytes, and if the quantity of bytes of remaining data of the complete data frame exceeds the sum of the expected length of the fragmented data frame and 64 bytes, perform S310; otherwise, perform S311.

S310: Read data based on the expected length of the fragmented data frame, add an intermediate fragmented data frame identifier, a fragment sequence number, and a fragmented data frame home identifier, to obtain an intermediate fragmented data frame, and return to S309.

S311. Determine whether the complete data frame is stored, and if the complete data frame is stored, perform S312; otherwise, return to S309.

S312. Read remaining data of the complete data frame, and add a last fragmented data frame identifier and a fragmented data frame home identifier, to obtain a last fragmented data frame.

It should be noted that if a $j^{th}$ port is bound to receive only a latency-sensitive data frame, a fragmented data frame obtained after fragmenting processing is performed on the complete data frame is buffered into the first queue; or if the $j^{th}$ port is not bound to receive only a latency-sensitive data frame, an obtained fragmented data frame is buffered into the second queue.

When performing step 220 and step 230, the first network device sends the first fragmented data frame to the forwarding processing module, and after sending the first fragmented data frame to the forwarding processing module, the first network device sends the second fragmented data frame to the forwarding processing module. It can be learned that the first fragmented data frame located in the first queue arrives at the forwarding processing module prior to the second fragmented data frame located in the second queue.

Figure 4:
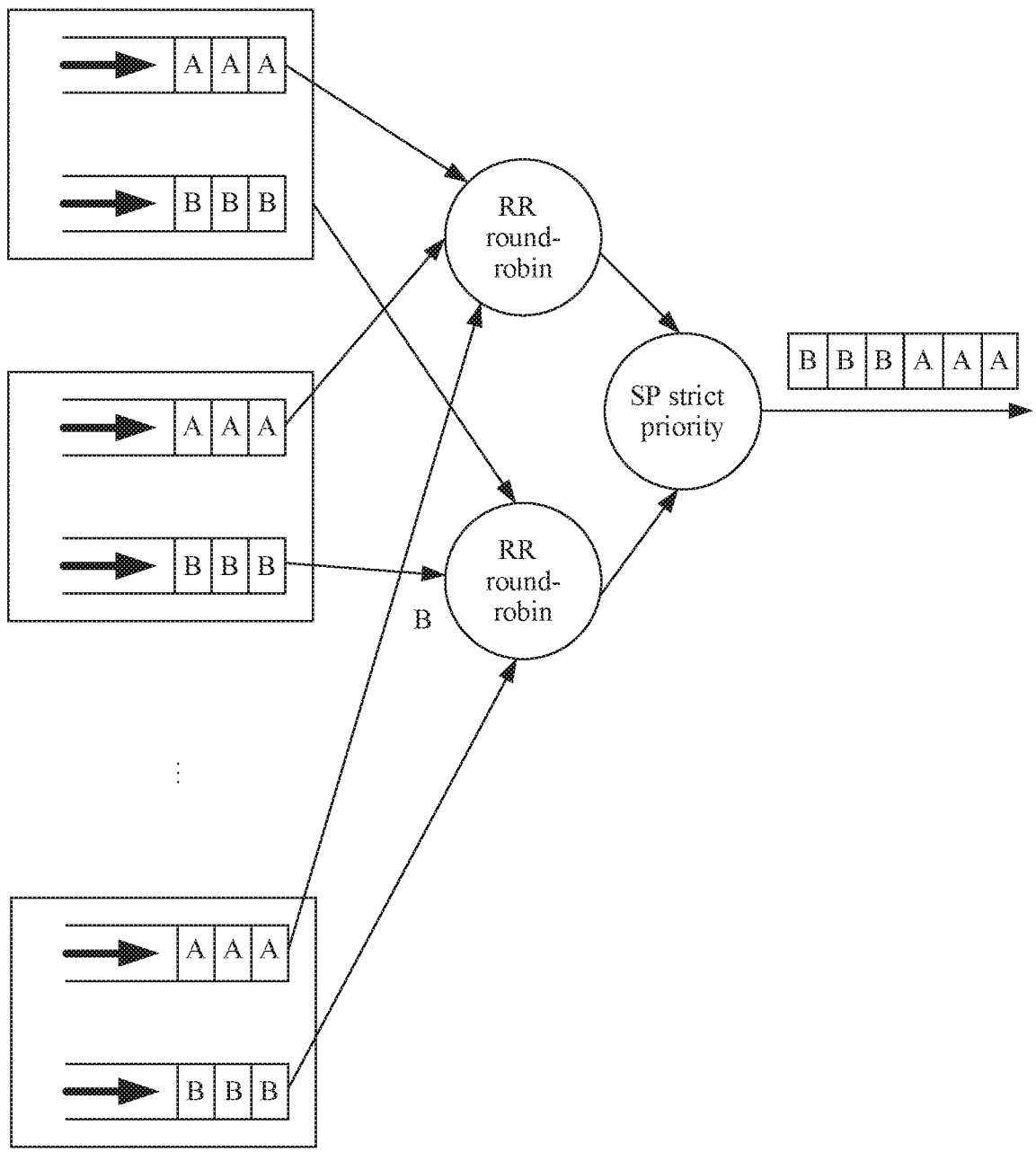
FIG. 4 is a schematic diagram of processing by an ingress module according to an embodiment of this application.

As shown in FIG. 4, any port is used as an example. It is assumed that the port is corresponding to a first queue and a second queue. A fragmented data frame in the first queue carries a latency-sensitive label, and fragmented data frames in the first queue are all represented using "A"; and a fragmented data frame in the second queue carries a latency-insensitive label, or may be an unlabeled fragmented data frame, and fragmented data frames in the second queue are all represented using "B".

A round-robin (RR) scheduling principle is used for a fragmented data frame in each first queue, to be more specific, fragmented data frames are sequentially obtained from each first queue. The RR scheduling principle is also used for a fragmented data frame in each second queue, to be more specific, fragmented data frames are sequentially obtained front each second queue. Further, a strict priority (SP) scheduling principle is used, and fragmented data frames obtained from the first queues are sent to the forwarding processing module prior to fragmented data frames obtained from the second queues, in other words, a priority of the fragmented data frame in the first queue is set to be higher than a priority of the fragmented data frame in the second queue. For example, after the fragmented data frames in the first queues are sent to the forwarding processing module, the fragmented data frames in the second queues are sent to the forwarding processing module, in other words, each "A" is sent to the forwarding processing module prior to each B.

Figure 5:
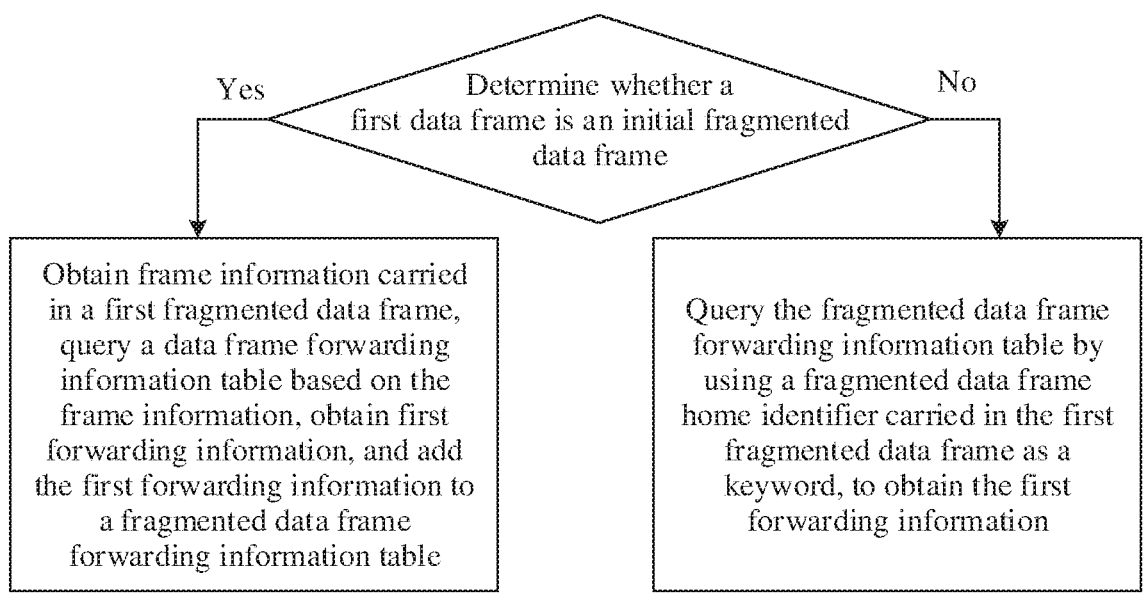
FIG. 5 is a first schematic diagram of obtaining forwarding information from different fragmented data frames according to an embodiment of this application.

As shown in FIG. 5, in step 220, obtaining the first forwarding information using the forwarding processing module may include but is not limited to the following method.

The forwarding processing module determines whether the first data frame is the initial fragmented data frame.

The forwarding processing module may perform determining based on whether the first data frame carries an initial fragmented data frame identifier.

When determining that the first fragmented data frame is the initial fragmented data frame of the first data frame, the forwarding processing module obtains frame information carried in the first fragmented data frame, queries a data frame forwarding information table based on the frame information, to obtain first forwarding information, and adds the first forwarding information to a fragmented data frame forwarding information table.

When determining that the first fragmented data frame is not the initial fragmented data frame of the first data frame, the forwarding processing module queries a fragmented data frame forwarding information table using the fragmented data frame home identifier carried in the first fragmented data frame as a keyword, to obtain first forwarding information.

Table 1, Table 2, and Table 3 are all examples of the data frame forwarding information table. Table 1 is a layer 2 L2 forwarding table, Table 2 is a layer 3 L3 forwarding table, and Table 3 is a Multiprotocol Label Switching (Multi-Protocol Label Switching, MPLS) forwarding table. Table 4 is a fragmented data frame forwarding information table. It should be understood that a plurality of types of information listed in Table 1 to Table 4 are merely an example, and do not constitute a limitation on this application. In addition, although the plurality of types of information are respectively listed in Table 1 to Table 4, persons skilled in the art may understand that forwarding entry information corresponding to Table 1 to Table 4 does not necessarily include all information. Alternatively, Table 1 to Table 4 may include information represented using another field not listed herein. This is not specifically limited in this embodiment of this application.

Figure 6B:
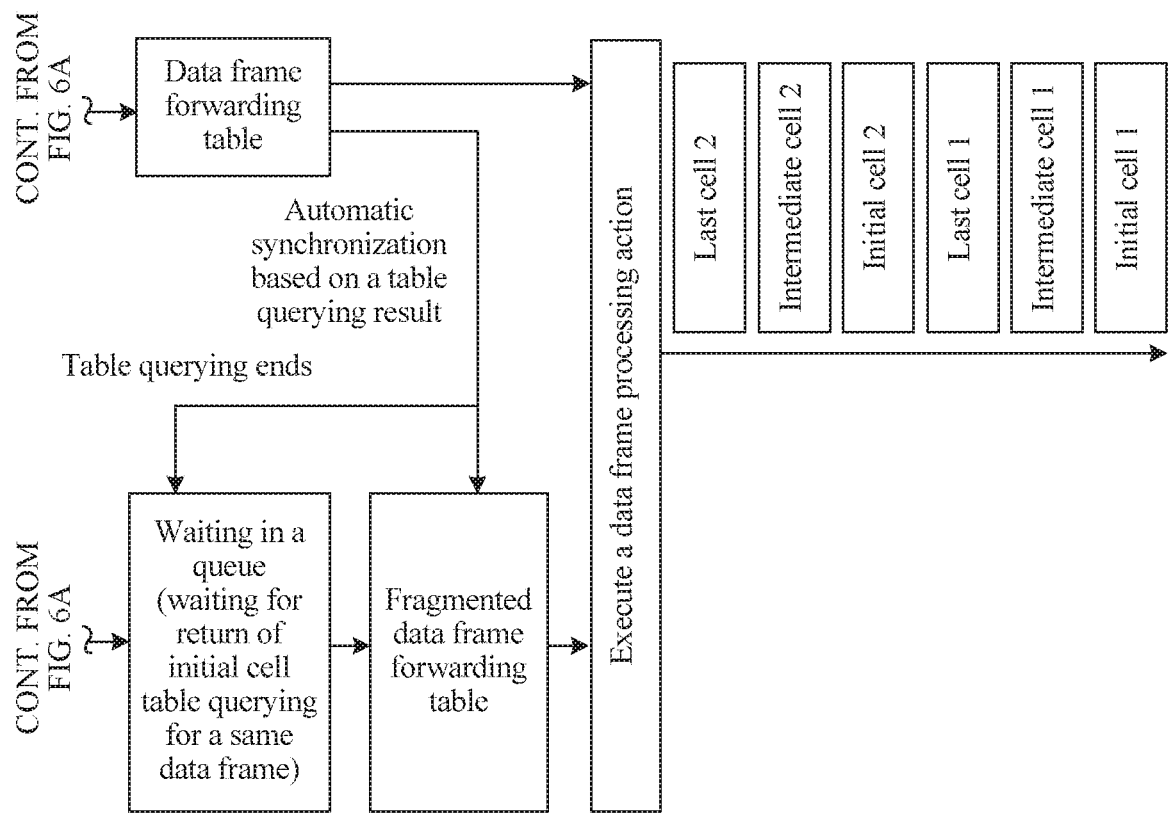

When the method shown in FIG. 5 is used, as shown in FIG. 6A and FIG. 6B, the first network device receives an initial fragmented data frame (packet fragmentation, or referred to as a cell 1) 1 included in the first data frame, obtains first forwarding information, and stores the first forwarding information in the fragmented data frame forwarding information table. The first network device further receives an intermediate fragmented data frame 1 (an intermediate cell 1) and a last fragmented data frame 1 (a last cell 1) in the first data frame, and queries the fragmented data frame forwarding information based on a fragmented data frame home identifier carried in the intermediate cell 1, to obtain the first forwarding information. Likewise, the first network device queries the fragmented data frame forwarding information based on a fragmented data frame home identifier carried in the last cell 1, to obtain the first forwarding information.

The first network device receives an initial fragmented data frame 2 (an initial cell 2) included in the second data frame, obtains second forwarding information, and stores the second forwarding information in the fragmented data frame forwarding information table. The first network device further receives an intermediate fragmented data frame 2 (an intermediate cell 2) and a last fragmented data frame 2 (a last cell 2) in the second data frame, and queries the fragmented data frame forwarding information based on a fragmented data frame home identifier carried in the intermediate cell 2, to obtain the second forwarding information. Likewise, the first network device queries the fragmented data frame forwarding information based on a fragmented data frame home identifier carried in the last cell 2, to obtain the second forwarding information.

For a non-initial fragmented data frame, obtaining the first forwarding information using the forwarding processing module may include but is not limited to the following two forms.

Form 1: The fragmented data frame forwarding information table stores the first forwarding information and the fragmented data frame home identifier, and when determining that the first fragmented data frame is not the initial fragmented data frame of the first data frame, the forwarding processing module directly queries the fragmented data frame forwarding information table using the fragmented data frame home identifier carried in the first fragmented data frame as a keyword, to obtain the first forwarding information.

Form 2: The fragmented data frame forwarding information table stores only the first forwarding information, and the first network device stores a mapping relationship between a fragmented data frame home identifier and first forwarding information independently, and in this case, the fragmented data frame home identifier is used as a keyword of an index, and the corresponding first forwarding information in the fragmented data frame forwarding information table is determined based on the keyword, to further obtain the first forwarding information.

It should be noted that a method for obtaining the second forwarding information using the forwarding processing module is the same as a method for obtaining the first forwarding information using the forwarding processing module. No repeated description is provided.

It can be learned from the foregoing description that, because the complex data frame forwarding information table does not need to be queried for the non-initial fragmented data frame, a table query latency can be greatly reduced, and forwarding efficiency can be improved.

TABLE 1

Data frame forwarding information table: L2 forwarding

| Address: | Data frame processing action (discarding, port |
|---|---|
| inPort + Vid + Pri | switching, VLAN switching, and the like) |
| (Ingress MAC | outPort (egress MAC port) |
| port + ingress virtual | outVid (egress virtual local area network |
| local area network | identifier) |
| identifier + ingress | outPri (egress priority field) |
| priority field) | Scheduling queue number |
| | Express (latency-sensitive) identifier (1: Express) |

TABLE 2

Data frame forwarding information table: L3 forwarding

| Address: | Data frame processing action (discarding, IP |
|---|---|
| inPort + source | switching, and the like) |
| Ip + Dscp | outPort |
| | Destination IP |
| | dscp |
| | Next hop information |
| | Scheduling queue number |
| | Express identifier (0: Normal) |

TABLE 3

Packet forwarding table

| Address: | Data frame processing action (discarding, |
|---|---|
| inPort + ingress | label switching, and the like) |
| label + EXP | outPort |
| | Egress label |
| | EXP |
| | Next hop information |
| | Scheduling queue number |
| | Express identifier (1: Express) |

TABLE 4

Cell forwarding table

| Address: Home Device | Data frame processing action (discarding) |
|---|---|
| ID, Home Port | outPort |
| ID + Home Frame ID | Scheduling queue number |
| | Express identifier (1: Express) |

In a possible design, the frame information carried in the initial fragmented data frame includes at least one of a MAC address, a Virtual Local Area Network Priority (Virtual Local Area Network Priority, Vlan/Pri) field, a differentiated services code point (Differentiated Services Code Point, Dscp) in an IP address, and a priority field (Label/Exp) in a label.

The first forwarding information may include an egress MAC port ID, and the first forwarding information may further include a data frame processing action, scheduling queue information, and latency-sensitive indication information. The scheduling queue information in the first forwarding information is used to indicate that a plurality of fragmented data frames included in the first data frame need to be buffered into a latency-sensitive queue corresponding to the forwarding processing module, and the latency-sensitive indication information indicates that the first data frame is a latency-sensitive service.

The second forwarding information may include an egress MAC port ID, and the second forwarding information may further include a data frame processing action, scheduling queue information, and latency-sensitive indication information. The latency-sensitive indication information may be used to indicate whether to add a latency-sensitive label to the second fragmented data frame. If the latency-sensitive indication information indicates that the second data frame is a latency-sensitive service, the current scheduling queue information indicates that a plurality of fragmented data frames included in the second data frame need to be buffered into a latency-sensitive queue corresponding to the forwarding processing module, and a latency-sensitive label needs to be added to the second fragmented data frame; or if the latency-sensitive indication information indicates that the second data frame is a latency-insensitive service, the current scheduling queue information indicates that a plurality of fragmented data frames included in the second data frame need to be buffered into a latency-insensitive queue corresponding to the forwarding processing module, and a latency-insensitive label needs to be added to the second fragmented data frame.

In a possible design, the latency-sensitive indication information may be represented using a latency-sensitive (Express) identifier. For example, the express identifier includes one bit. When the express identifier is 1, it indicates that a current data frame is a latency-sensitive service, and a fragmented data frame corresponding to the current data frame needs to carry a latency-sensitive label; or when the express identifier is 0, it indicates that a current data frame is a latency-insensitive service, and a fragmented data frame corresponding to the current data frame needs to carry a latency-insensitive label. Certainly, 0 and 1 may also indicate opposite meanings. For example, when the express identifier is 0, it indicates that the current data frame is a latency-sensitive service, and the fragmented data frame corresponding to the current data frame needs to carry the latency-sensitive label; or when the express identifier is 1, it indicates that the current data frame is a latency-insensitive service, and the fragmented data frame corresponding to the current data frame needs to carry a latency-insensitive label. Certainly, the express identifier may include a plurality of bits. This is not specifically limited in this application.

Processing actions for data frames in the first forwarding information and the second forwarding information may include discarding, deleting a byte, adding a byte, modifying a byte, and the like. For example, an IP address, a MAC address, or the like in a fragmented data frame needs to be modified.

In a possible design, a principle for differentiating whether a data frame is a latency-sensitive service may include but is not limited to the following: physical port-based differentiation, flexible Ethernet client (FlexE Client) MAC-based differentiation, MAC address-based differentiation, VID-based differentiation, VID+Pri-based differentiation, IP address-based differentiation, IP address+DSCP-based differentiation, MPLS label-based differentiation, MPLS+EXP-based differentiation, or any combination of the differentiation methods.

For example, after receiving a complete data frame, a network device processes the complete data frame, to obtain three fragmented data frames: a fragmented data frame 1, a fragmented data frame 2, and a fragmented data frame 3. The fragmented data frame 1 is an initial fragmented data frame, the fragmented data frame 2 is an intermediate fragmented data frame, and the fragmented data frame 3 is a last fragmented data frame. It is assumed that a port that receives the complete data frame is not bound to receive only a data frame of a latency-sensitive service. When the data frame forwarding information table is Table 1, the forwarding processing module parses frame information carried in the fragmented data frame 1, and queries Table 1 based on inPort+Vid+Pri in the frame information, to obtain forwarding information, and store the forwarding information in the fragmented data frame forwarding information table, as shown in Table 4. The forwarding information includes: a data frame processing action (for example, discarding), an outPort (namely, an egress MAC port ID), and a scheduling queue number (namely, scheduling queue information, and because the express identifier is 1, the scheduling queue number is a queue number of the latency-sensitive queue corresponding to the forwarding processing module), and an express identifier (namely, latency-sensitive indication information, and because the express identifier is 1, a latency-sensitive label needs to be added to each fragmented data frame in the data frame).

The forwarding processing module queries Table 4 based on a home device ID, a home port ID, and a home frame ID that are carried in a fragmented data frame 2 and a fragmented data frame 3, to learn the forwarding information, and learns, based on the express identifier in Table 4, that a location of the express identifier is 1. Therefore, the forwarding processing module determines that the fragmented data frame 2 and the fragmented data frame 3 need to carry a latency-sensitive label.

For another example, when the data frame forwarding information table is Table 2, the forwarding processing module parses frame information carried in the fragmented data frame 1, queries Table 1 based on inPort+source Ip+Dscp in the frame information, to obtain forwarding information, and stores the forwarding information in the fragmented data frame forwarding information table (not shown). The forwarding information includes: a data frame processing action (for example, IP switching), an outPort (namely, an egress MAC port ID), a scheduling queue number (namely, scheduling queue information, and because the express identifier is 0, the scheduling queue number is a queue number of the latency-insensitive queue corresponding to the forwarding processing module), and an express identifier (namely, latency-sensitive indication information, and because the express identifier is 0, a latency-insensitive label needs to be added to each fragmented data frame in the data frame). Table 3 is similar to Table 1. No repeated description is provided.

Further, the forwarding processing module sends, to an egress module in the first network device, a fragmented data frame in the latency-sensitive queue corresponding to the forwarding processing module prior to a fragmented data frame in the latency-insensitive queue corresponding to the forwarding processing module.

In addition, the forwarding processing module is further configured to: store data per fragmented data frame, and process a fragmented data frame based on a data frame processing action, for example, deleting a byte, adding a byte, or modifying a byte. It should be understood that, in actual application, the forwarding processing module mainly edits the initial fragmented data frame, and basically performs no other editing on the intermediate fragmented data frame and the last fragmented data frame, but only determines whether the discarding processing needs to be performed.

After step 220, for the first fragmented data frame, the packet processing method provided in this application further includes the following two possible processing manners.

Processing manner 1: A transparent transmission manner.

The first network device transparently transmits the first fragmented data frame to the second network device based on the first forwarding information.

Transparent transmission (Transparent transmission), also referred to as "transparent transmission", means that a transport network is responsible for only transmitting, to a destination node, a service that needs to be transmitted regardless of the to-be-transmitted service, while ensuring transmission quality, without processing the to-be-transmitted service.

A characteristic of this manner is that a fragmented data frame is used as a granularity, and the second network device (namely, a next hop device) needs to have a function of receiving and identifying the fragmented data frame.

Figure 7A:
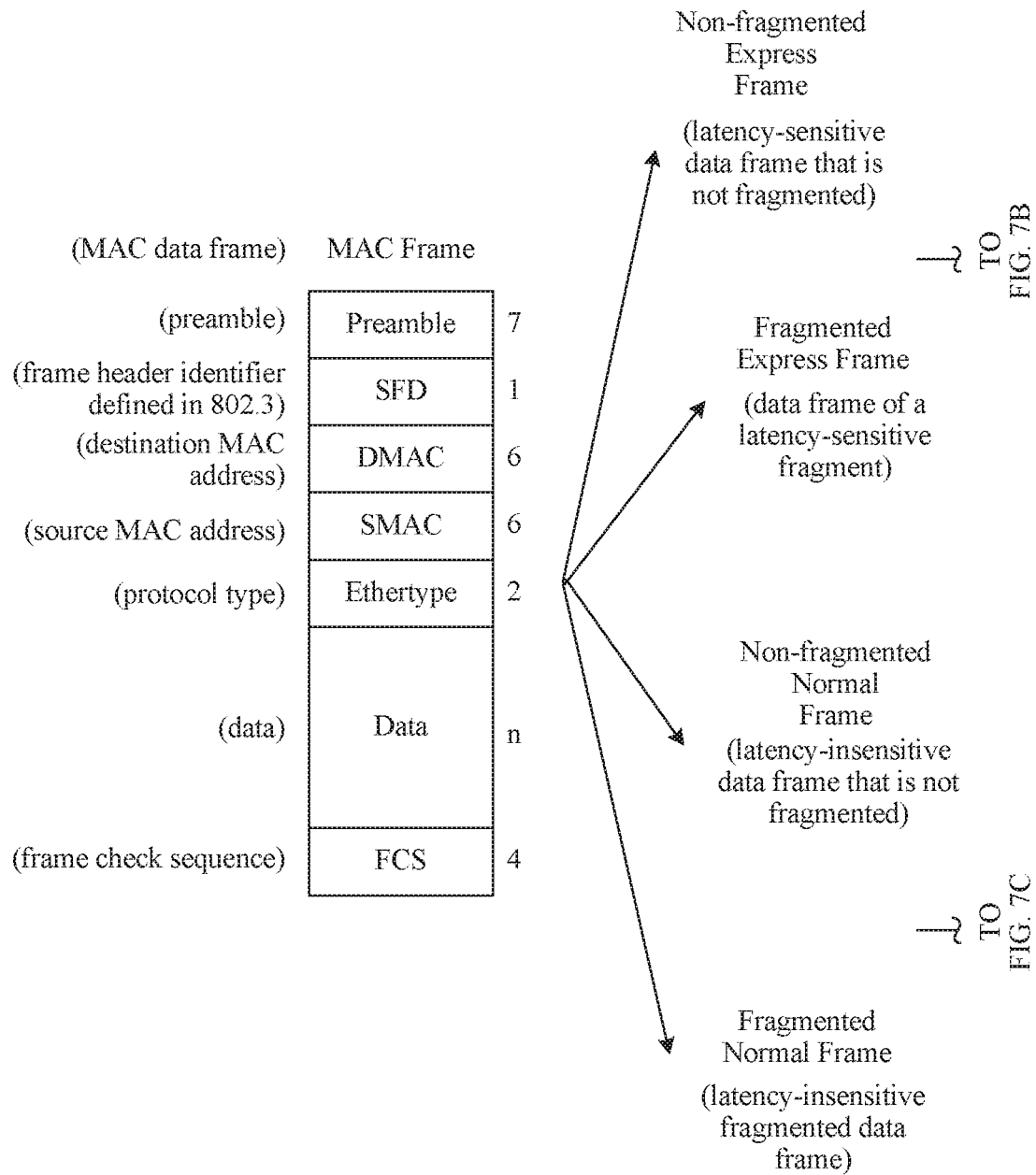

In a possible design, as shown in Table 5 and FIG. 7A, FIG. 7B, and FIG. 7C, the first network device needs to add a field to an unlabeled fragmented data frame before transparently transmitting the fragmented data frame to the second network device. For example, SFD-E-FL, SFD-E-F, SFD-E-I, or SFD-E-L is added to a fragmented data frame to which a latency-sensitive label needs to be added, and SFD-N-FL, SFD-N-F, SFD-N-I, or SFD-N-L is added to a fragmented data frame to which a latency-insensitive label needs to be added. In this case, all fragmented data frames that need to be transparently transmitted carry a latency-sensitive label or a latency-insensitive label. In addition, an FCS may be generated in an exclusive OR (XOR) manner of 32-bit data and 0x0000FFFF and for a last fragmented data frame, an FCS of an entire data frame is generated according to a check algorithm defined in IEEE802.3, or for all fragmented data frames in a same complete data frame, an FCS is generated for the complete data frame.

This application provides a specific definition (shown in Table 5) of each field carried in a fragmented data frame and a schematic structural diagram of each field (shown in FIG. 7A, FIG. 7B, and FIG. 7C), it should be noted that Table 5 and FIG. 7A, FIG. 7B, and FIG. 7C merely show a possible implementation of this application, and are not construed as a specific limitation on this application.

Processing manner 2: A reassembly manner.

The first network device buffers the first fragmented data frame, and after determining that all fragmented data frames included in the first data frame are buffered, the first network device reassembles all the fragmented data frames included in the first data frame to obtain a reassembled first data frame, and sends the reassembled first data frame to the second network device based on the first forwarding information.

Fragmented data frames having a same fragmented data frame home identifier are reassembled based on a fragmented data frame home identifier carried in each fragmented data frame, to obtain the reassembled first data frame.

In a possible design, the intermediate fragmented data frame of the first data frame carries a fragment sequence number. In this case, a method in which the first network device reassembles all the fragmented data frames included in the first data frame to obtain the reassembled first data frame may include but is not limited to the following method: reassembling, based on a fragment sequence number carried in an intermediate fragmented data frame of each first data frame, an initial fragmented data frame of the first data frame, all intermediate fragmented data frames included in the first data frame, and a last fragmented data frame of the first data frame, to obtain a reassembled first data frame.

The intermediate fragmented data frames may be quickly reassembled based on the fragment sequence number, and then an initial fragmented data frame and a last fragmented data frame that have a same fragmented data frame home identifier and the reassembled intermediate fragmented data frame are reassembled, to obtain the reassembled first data frame.

TABLE 5

| Type | Field | Meaning |
| --- | --- | --- |
| Standard data frame | SFD | A frame header identifier defined in 802.3 |
| Data frame that carries a latency-sensitive label | SFD-E-FL | A complete data frame, which is a latency-sensitive service |
| Fragmented data frame that carries a latency-sensitive label | SFD-E-F | An initial fragmented data frame, which is a latency-sensitive service |
| | SFD-E-I | An intermediate fragmented data frame, which is a latency-sensitive service |
| | SFD-E-L | A last fragmented data frame, which is a latency-sensitive service |
| Data frame that carries a latency-insensitive label | SFD-N-FL | A complete data, frame, which is a latency-insensitive service |
| Fragmented data, frame that carries a latency-insensitive label | SFD-N-F | An initial fragmented data frame, which is a latency-insensitive service |
| | SFD-N-I | An intermediate fragmented data frame, which is a latency-insensitive service |
| | SFD-N-L | A last fragmented data frame, which is a latency-insensitive service |
| Fragmented data frame home identifier | Home Device ID | An identifier of a device that generates a fragmented data frame |
| | Home Port ID | An identifier of an ingress MAC port that receives a data frame |
| | Home Frame ID | A home data frame identifier |
| Fragment sequence number | Fragcount | Used for reassembly of fragmented data frames |
| Cyclic redundancy check (Cyclic Redundancy Check, CRC) code of a fragmented data frame | CELL-FCS | CRC check of an initial fragmented data frame and intermediate fragmented data frame, and an exclusive OR (XOR) value of 32-bit data and 0x0000FFFF |

A characteristic of this manner is that a complete data frame is used as a granularity, to adapt to a scenario in which the second network device cannot process a fragmented data frame.

The following describes a processing procedure of the egress module with reference to the accompanying drawings.

Figure 8:
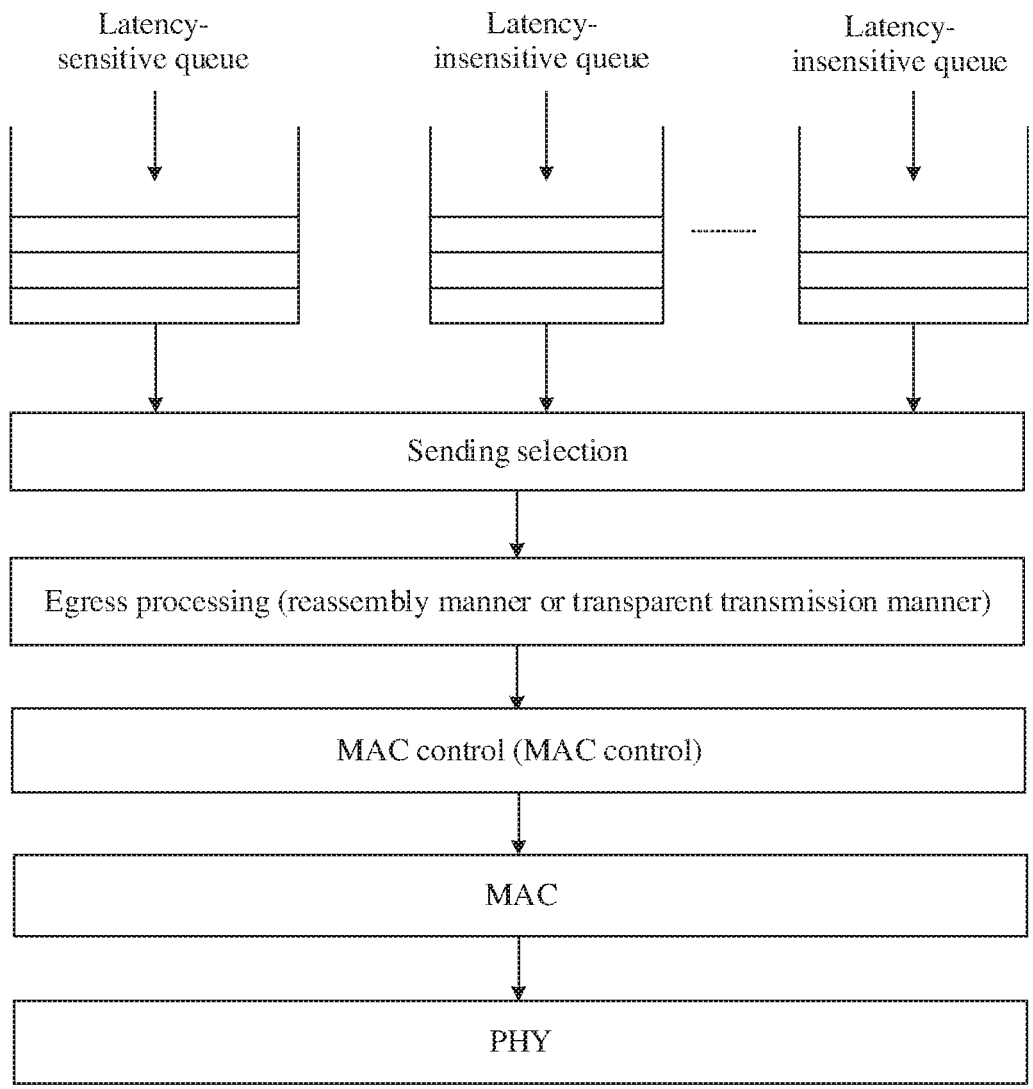
FIG. 8 is a first schematic diagram of a processing procedure of an egress module according to an embodiment of this application.

As shown in FIG. 8, a forwarding processing module in a network device is corresponding to one latency-sensitive queue and two latency-insensitive queues. A fragmented data frame in the latency-sensitive queue arrives at an egress module in the network device prior to a fragmented data frame in the latency-insensitive queue. After receiving the fragmented data frame, the egress module performs sending selection based on forwarding information, to be more specific, the egress module allocates the fragmented data frame to a corresponding egress MAC port based on an egress MAC port ID in the forwarding information. The fragmented data frame is sent to a next hop device in the foregoing first processing manner, or a reassembled data frame is sent to a next hop device in the foregoing second processing method.

Figure 9:
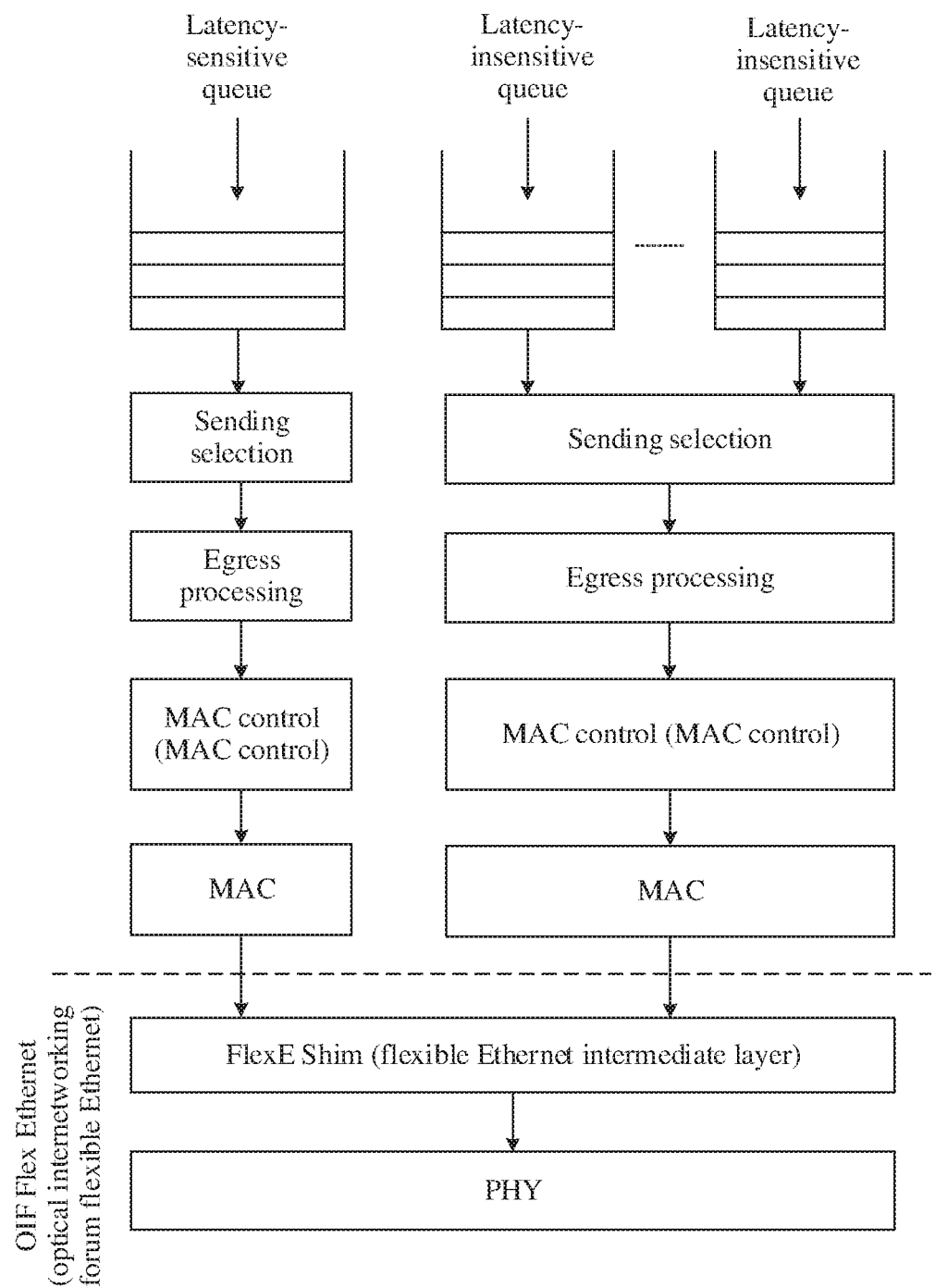
FIG. 9 is a second schematic diagram of a processing procedure of an egress module according to an embodiment of this application.
Figure 10:
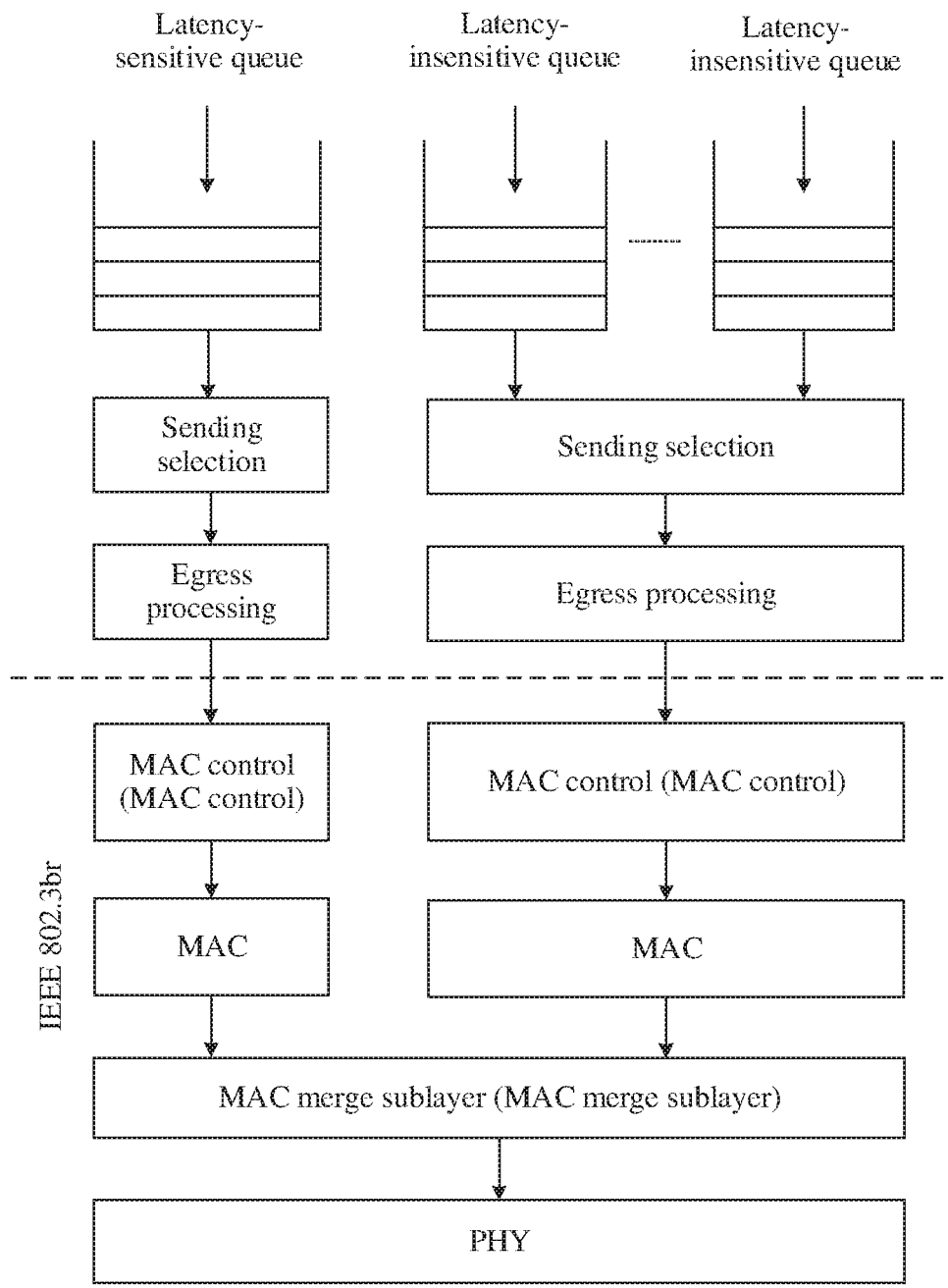
FIG. 10 is a third schematic diagram of a processing procedure of an egress module according to an embodiment of this application.

In addition, this application may be further combined with an existing MAC technology, to further reduce a forwarding latency, and therefore, this application is relatively highly practical. FIG. 9 is an optimized manner of the embodiment shown in FIG. 8. A physical layer interface uses a channelized flexible Ethernet technology defined in the Optical Internetworking Forum (OIF) flexible Ethernet (or Flex Ethernet) protocol, different MAC is selected for a latency-sensitive queue and a latency-insensitive queue, and the optimized manner is implemented by adapting a sublayer of a flexible Ethernet intermediate layer (FlexE Shim) to a PHY layer. In this solution, not only a low-latency forwarding requirement of a latency-sensitive service is met, but also a network fragmenting function can be implemented through MAC isolation, thereby ensuring differentiation of performance indicators such as latencies and bandwidths of different services in a transmission process. FIG. 10 is also an optimized manner of the embodiment shown in FIG. 8. Herein, a MAC layer interface uses a channelized MAC function defined in the IEEE 802.3br protocol, different MAC is selected for a latency-sensitive queue and a latency-insensitive queue, and the optimized manner is implemented by adapting a MAC merge sublayer to the PHY layer. In this solution, not only a low-latency forwarding requirement of a latency-sensitive service is met, but also a network fragmenting function can be implemented through MAC isolation, thereby ensuring differentiation of performance indicators such as latencies and bandwidths of different services in a transmission process.

The following describes in detail an example implementation process of the embodiment of this application.

Figure 11:
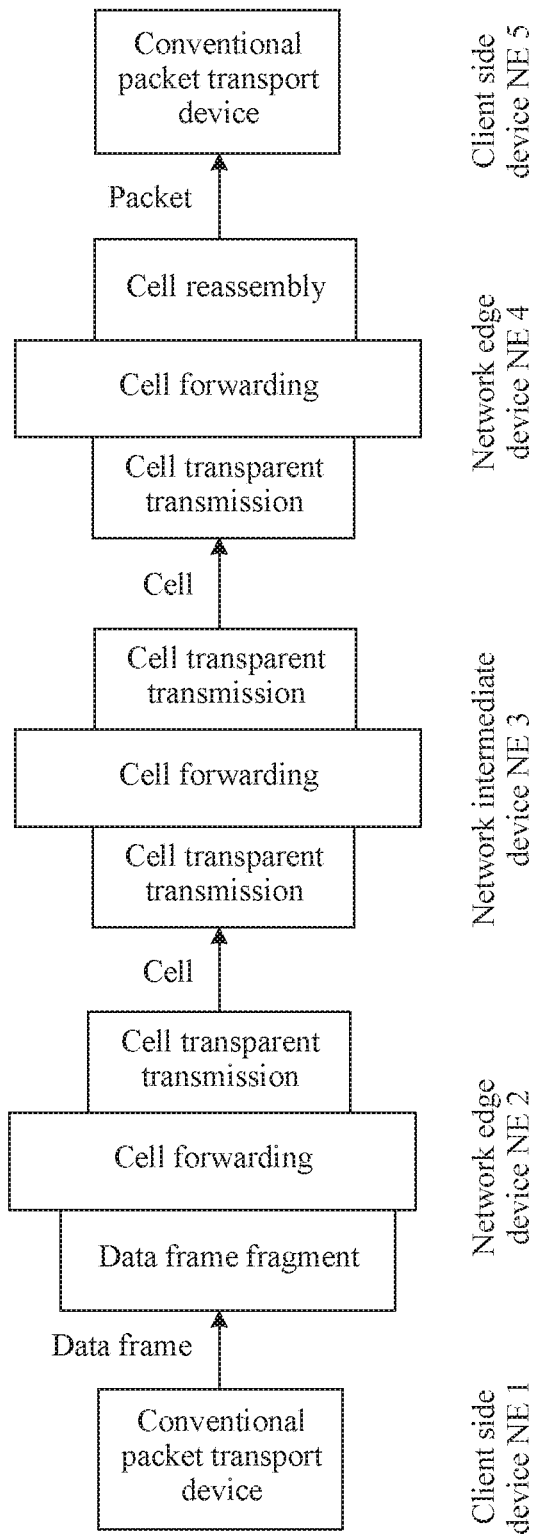
FIG. 11 is a schematic diagram of forwarding between forwarding devices in a transparent transmission manner according to an embodiment of this application.
Figure 12:
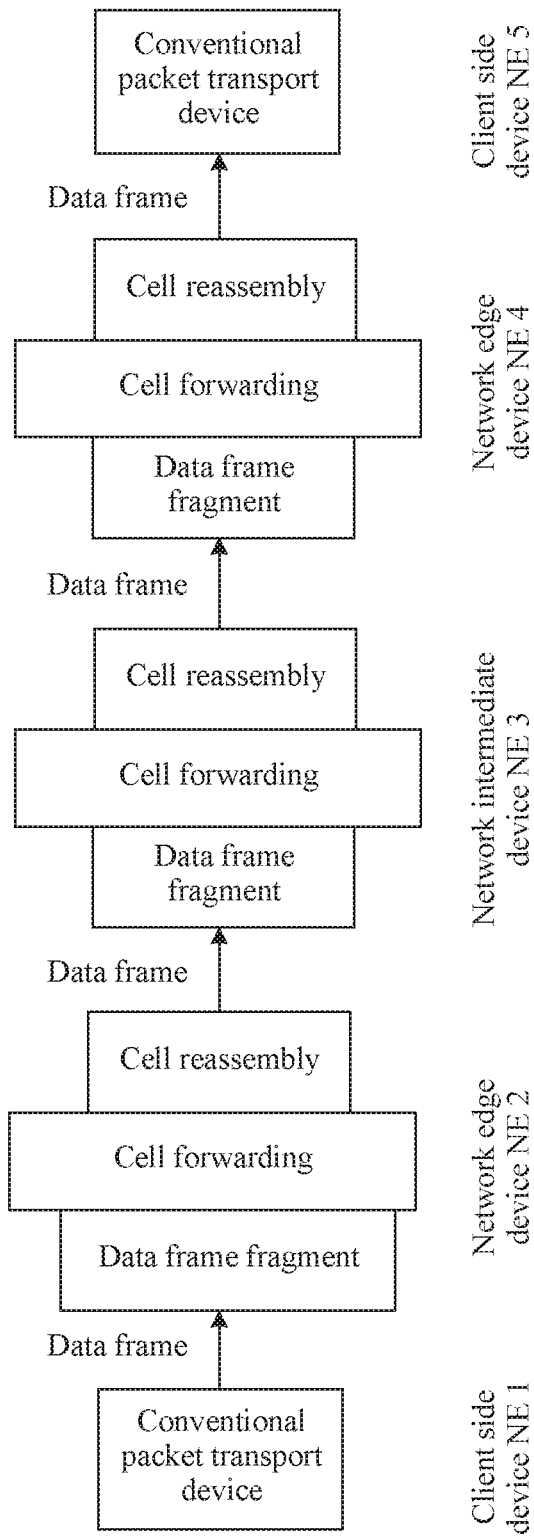
FIG. 12 is a schematic diagram of forwarding between forwarding devices in a reassembly manner according to an embodiment of this application.

In FIG. 11 and FIG. 12, a fragmented data frame is represented using a cell. As shown in FIG. 11, client side devices NE 1 and NE 5 are conventional packet forwarding devices, and support only data frame forwarding; and a network edge device NE 2, a network intermediate device NE 3, and a network edge device NE 4 are packet transport network (Packet Transport Network, PTN) devices that support fragmented data frame forwarding, and support Multiprotocol Label Switching (Multiprotocol Label Switching, MPLS) forwarding, data frame fragmenting, a reassembly manner, and a transparent transmission manner.

The following uses a service path NE 1→NE 2→NE 3→NE 4→NE 5 as an example to describe a service configuration procedure and a service processing procedure.

The service configuration procedure is as follows.

Step 1: Configure an MPLS forwarding information table of the NE 2, the NE 3, and the NE 4, namely, a data frame forwarding information table based on the service forwarding path (NE 1→NE 2→NE 3→NE 4→NE 5) by performing networking using an Ethernet (Gigabit Ethernet, GE) port with a 1000M transmission rate.

Step 2: Ingress MAC ports of the NE 2, the NE 3, and the NE 4 separately enable a port-based data frame fragmenting function, and configure an expected length (for example, 256 bytes) of a fragmented data frame, and egress MAC ports of the NE 2 and the NE 3 are separately configured to be in a transparent transmission manner, and an egress MAC port of the NE 4 is configured to be in a reassembly manner.

Step 3: The NE 1 simultaneously sends service streams: a latency-sensitive service and a latency-insensitive service.

None of ingress MAC ports of the NE 2, the NE 3, the NE 4, and the NE 5 is bound to a latency-sensitive service.

The service processing procedure is as follows.

For a data frame with a data frame length of 1500 bytes, the NE 2 fragments the data frame into one initial fragmented data frame of 256 bytes, four intermediate fragmented data frames of 256 bytes, and one last fragmented data frame of 220 bytes, adds a fragmented data frame home identifier to each fragmented data frame, and adds a fragment sequence number to the intermediate fragmented data frame.

Then a forwarding processing module in the NE 2 queries the data frame forwarding information table based on frame information carried in the initial fragmented data frame, to obtain forwarding information, and stores the forwarding information in the fragmented data frame forwarding information table, and quickly queries the fragmented data frame forwarding information table based on fragmented data frame home identifiers carried in the intermediate fragmented data frame and the last fragmented data frame, to obtain forwarding information.

When an express identifier in the forwarding information is 1, the forwarding processing module in the NE 2 stores the six fragmented data frames in a latency-sensitive queue corresponding to the forwarding processing module; or when an express identifier in the forwarding information is 0, the forwarding processing module in the NE 2 stores the six fragmented data frames in a latency-insensitive queue corresponding to the forwarding processing module.

If the data frame is a latency-sensitive service, the forwarding processing module in the NE 2 stores the six fragmented data frames in the latency-sensitive queue corresponding to the forwarding processing module, and preferentially sends the six fragmented data frames to an egress module.

In addition, the forwarding processing module in the NE 2 further needs to process the initial fragmented data frame in the data frame based on a data frame processing action in the forwarding information.

The egress module in the NE 2 transparently transmits the six fragmented data frames to the NE 3 sequentially.

After receiving the fragmented data frame sent by the NE 2, an ingress module in the NE 3 buffers the fragmented data frame into a first queue in the NE 3 based on a latency-sensitive label carried in the fragmented data frame, and subsequent processing of a forwarding processing module and an egress module is the same as that of the NE 2.

The NE 4 is the same as the NE 3 before the fragmented data frame enters an egress module for processing. The egress module in the NE 4 reassembles the six fragmented data frames based on the fragmented data frame home identifiers and the fragment sequence numbers, and sends a reassembled complete data frame to the NE 5.

Packet processing is implemented in the foregoing solution, such that an end-to-end latency of the latency-sensitive service in the NE 1 to the NE 5 can be reduced to a microsecond level, and a single-device forwarding latency and Uttering can be reduced to a level of hundreds of nanoseconds.

As shown in FIG. 12, receiving ports of the NE 2, the NE 3, and the NE 4 all enable a port-based data frame fragmenting function, and egress modules are all configured to be in a reassembly manner.

Compared with the embodiment shown in FIG. 11, because egress data of each device is a data frame at a MAC layer, in the method provided in this application, an interconnection to a conventional packet forwarding device can be implemented. Further, each device causes a data frame fragmenting latency and a fragmented data frame reassembly latency for once, and an end-to-end latency is slightly long. However, because forwarding is still performed inside the device based on the fragmented data frame, a scheduling waiting latency of the fragmented data frame is much shorter than a data frame-based waiting latency of a conventional packet forwarding device. Therefore, a latency-sensitive service is basically not affected by a latency-insensitive service, such that a forwarding latency is greatly reduced.

Based on a same concept, this application further provides a packet processing apparatus. The apparatus may be configured to perform the foregoing method embodiment corresponding to FIG. 2. For an implementation of the packet processing apparatus provided in this embodiment of this application, refer to an implementation of the method. No repeated description is provided.

Figure 13:
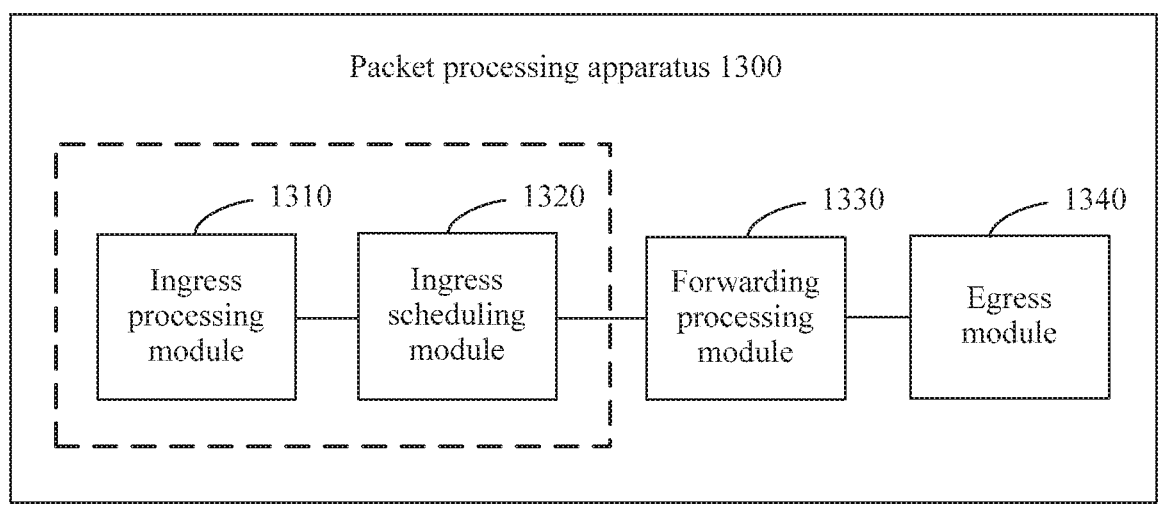
FIG. 13 is a first schematic structural diagram of a packet processing apparatus according to an embodiment of this application.

As shown in FIG. 13, this application provides a packet processing apparatus 1300, configured to perform the method in the embodiment corresponding to FIG. 2. The apparatus 1300 includes an ingress processing module 1310, an ingress scheduling module 1320, and a forwarding processing module 1330.

The ingress processing module 1310 is configured to: obtain, at a MAC layer, a first fragmented data frame included in a first data frame, and buffer the first fragmented data frame into a first queue. The first queue is a latency-sensitive queue.

The ingress processing module 1310 is further configured to: obtain, at the MAC layer, a second fragmented data frame included in a second data frame, and buffer the second fragmented data frame into a second queue. The second queue is a latency-insensitive queue.

The ingress scheduling module 1320 is configured to: send the first fragmented data frame to the forwarding processing module 1330, and send the second fragmented data frame to the forwarding processing module 1330 after sending the first fragmented data frame to the forwarding processing module 1330.

The forwarding processing module 1330 is configured to: receive the first fragmented data frame, and obtain first forwarding information. The first forwarding information is forwarding information of the first data frame; and the forwarding processing module is further configured to: receive the second fragmented data frame, and obtain second forwarding information, where the second forwarding information is forwarding information of the second data frame.

In a possible design, when the first fragmented data frame included in the first data frame is obtained at the MAC layer, the ingress processing module 1310 is configured to: receive, using a first ingress MAC port, the first fragmented data frame that carries a latency-sensitive label.

In a possible design, when the first fragmented data frame included in the first data frame is obtained at the MAC layer, the ingress processing module 1310 is configured to: receive the first data frame using a first ingress MAC port, and perform fragmenting processing on the first data frame to obtain the first fragmented data frame.

According to a specified rule, the first ingress MAC port is configured to be bound to receive a latency-sensitive data frame.

In a possible design, the first fragmented data frame includes a latency-sensitive label.

In a possible design, when the fragmenting processing is performed on the first data frame to obtain the first fragmented data frame, the ingress processing module 1310 is configured to: when it is determined that a length of the first data frame is greater than or equal to a first preset threshold, read the first data frame based on a first preset packet length to obtain an initial fragmented data frame of the first data frame, where the initial fragmented data frame of the first data frame carries an initial fragmented data frame identifier and a fragmented data frame home identifier; after the initial fragmented data frame is obtained, determine whether a length of remaining data of the first data frame is greater than or equal to a second preset threshold; and when the length of the remaining data of the first data frame is greater than or equal to the second preset threshold, read the remaining data of the first data frame based on a second preset packet length to obtain an intermediate fragmented data frame of the first data frame, where the intermediate fragmented data frame of the first data frame carries an intermediate fragmented data frame identifier and the fragmented data frame home identifier; or when the length of the remaining data of the first data frame is less than the second preset threshold, use the remaining data of the first data frame as a last fragmented data frame of the first data frame, where the last fragmented data frame of the first data frame carries a last fragmented data frame identifier and the fragmented data frame home identifier, where the first fragmented data frame is the initial fragmented data frame of the first data frame, or the first fragmented data frame is the intermediate fragmented data frame of the first data frame, or the first fragmented data frame is the last fragmented data frame of the first data frame.

In a possible design, when obtaining the first forwarding information, the forwarding processing module 1330 is configured to: when it is determined that the first fragmented data frame is the initial fragmented data frame of the first data frame, obtain frame information carried in the first fragmented data frame, query a data frame forwarding information table based on the frame information, to obtain first forwarding information, and add the first forwarding information to a fragmented data frame forwarding information table; or when it is determined that the first fragmented data frame is not the initial fragmented data frame of the first data frame, query a fragmented data frame forwarding information table using the fragmented data frame home identifier carried in the first fragmented data frame as a keyword, to obtain first forwarding information.

In a possible design, the apparatus 1300 further includes: an egress module 1340, configured to: after the first forwarding information is obtained, transparently transmit the first fragmented data frame to a second network device based on the first forwarding information.

Alternatively, the egress module 1340 is configured to: after the first forwarding information is obtained, buffer the first fragmented data frame; and after it is determined that all fragmented data frames included in the first data frame are buffered, reassemble all the fragmented data frames included in the first data frame to obtain a reassembled first data frame, and send the reassembled first data frame to the second network device based on the first forwarding information.

In a possible design, when the second fragmented data frame included in the second data frame is obtained at the MAC layer, the ingress processing module 1310 is configured to: receive, using a second ingress MAC port, the second fragmented data frame that carries a latency-insensitive label.

In a possible design, when the second fragmented data frame included in the second data frame is obtained at the MAC layer, the ingress processing module 1310 is configured to: receive the second data frame using a second ingress MAC port, and perform fragmenting processing on the second data frame to obtain the second fragmented data frame.

In a possible design, the second forwarding information includes latency-sensitive indication information, and the latency-sensitive indication information is used to indicate whether a latency-sensitive label is added to the second fragmented data frame.

Compared with FIG. 1, overall division of the packet processing apparatus in FIG. 13 is basically consistent with that in FIG. 1, and both the ingress processing module and the ingress scheduling module in FIG. 13 are specific division of an ingress module.

Figure 14:
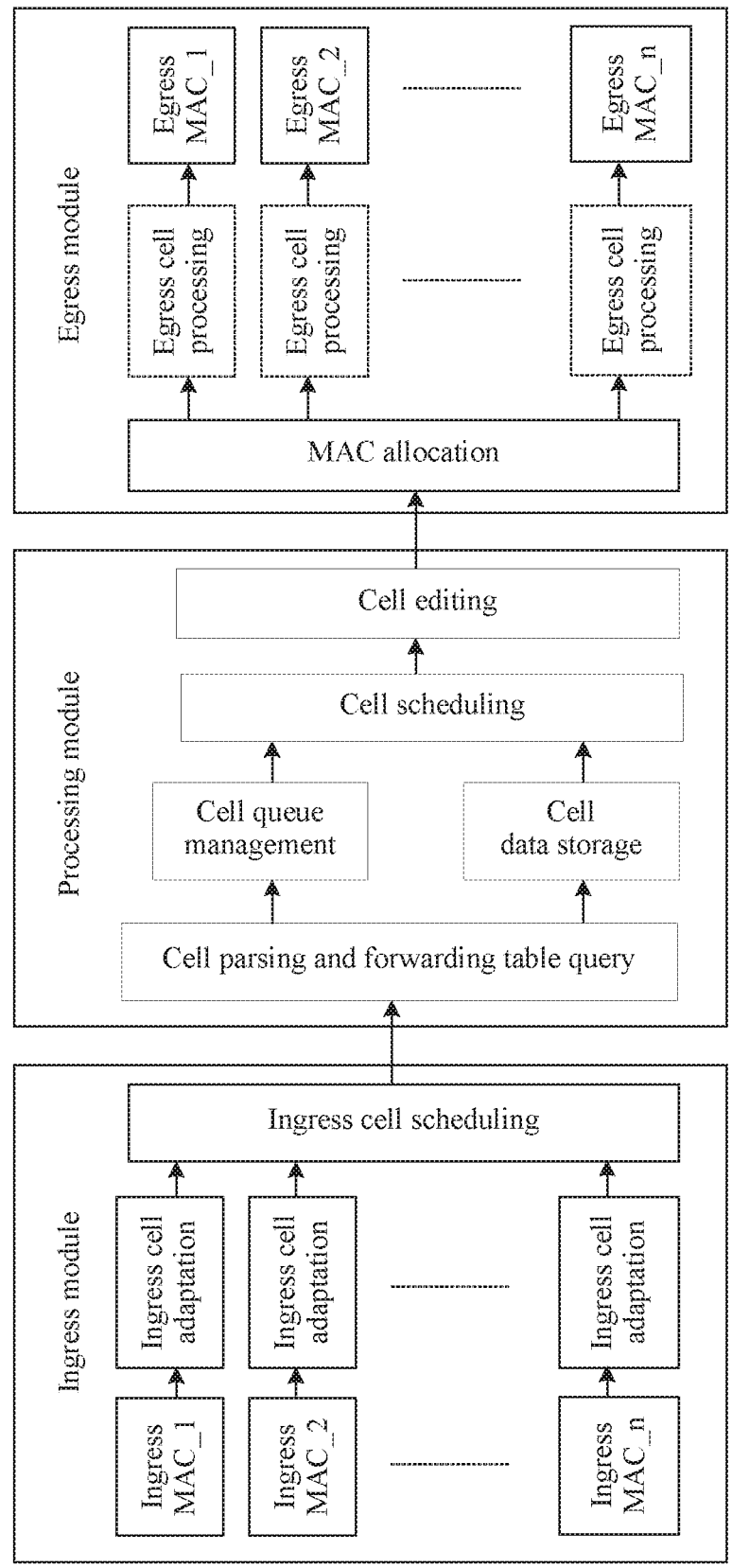
FIG. 14 is a second schematic structural diagram of a packet processing apparatus according to an embodiment of this application.

Further, based on the apparatus shown in FIG. 13, an embodiment of the present disclosure further provides a packet processing apparatus, and further division of each module. As shown in FIG. 14, the packet processing apparatus includes an ingress module, a forwarding processing module, and an egress module.

The ingress module includes an ingress MAC module, an ingress cell adaptation module, and an ingress cell scheduling module.

The ingress MAC module and the ingress cell adaptation module are equivalent to the ingress processing module in FIG. 13. For example, each ingress MAC module corresponds to one ingress MAC port, and is configured to receive a data frame or a fragmented data frame sent by another network device. The ingress cell adaptation module is configured to: obtain, based on the data frame or the fragmented data frame received by the corresponding ingress MAC module, a first fragmented data frame included in a first data frame, and obtain a second fragmented data frame included in a second data frame.

The ingress cell scheduling module is equivalent to the ingress scheduling module in FIG. 13, and is configured to: send the first fragmented data frame to the forwarding processing module, and send the second fragmented data frame to the forwarding processing module after sending the first fragmented data frame to the forwarding processing module.

The forwarding processing module may include a cell parsing and forwarding table querying module, a cell queue management module, a data storage module, a cell scheduling module, and a cell editing module.

The cell parsing and forwarding table querying module is equivalent to the forwarding processing module in FIG. 13, and is configured to: receive the first fragmented data frame, obtain first forwarding information, receive the second fragmented data frame, and obtain second forwarding information.

In addition, the forwarding processing module may further have other functions. The functions are implemented using the following modules.

The cell queue management module is configured to: store, in a latency-sensitive queue corresponding to the forwarding processing module based on forwarding information, a fragmented data frame that carries a latency-sensitive label, and store, in a latency-insensitive queue corresponding to the forwarding processing module based on the forwarding information, a fragmented data frame that carries a latency-insensitive label.

The data storage module is configured to store data per fragmented data frame.

The cell scheduling module is configured to send, to the egress module, a fragmented data frame in the latency-sensitive queue corresponding to the forwarding processing module prior to a fragmented data frame in the latency-insensitive queue corresponding to the forwarding processing module.

The cell editing module is configured to process a fragmented data frame based on a data frame processing action in the forwarding information.

The egress module is equivalent to the egress module in FIG. 13, and may include a MAC allocation module, an egress cell forwarding processing module, and an egress MAC module.

Each egress MAC module is corresponding to one egress MAC port.

The MAC allocation module is configured to: after a fragmented data frame sent by the forwarding processing module is received, allocate the fragmented data frame to a corresponding egress MAC module based on an egress MAC port ID in the forwarding information.

The egress cell forwarding processing module is configured to: directly send a fragmented data frame to a next hop network device using a corresponding egress MAC module; or buffer a fragmented data frame, after it is determined that all fragmented data frames included in the data frame corresponding to the fragmented data frame are buffered, reassemble all the fragmented data frames included in the data frame to obtain a reassembled data frame, and send the reassembled data frame to the next hop network device using the corresponding egress MAC module.

It should be understood that specific division of the foregoing modules is merely used as an example, and is not construed as a limitation on this application.

Based on a same concept, this application further provides a network device. The device may be configured to perform the method embodiment corresponding to FIG. 2. For an implementation of the network device provided in this embodiment of this application, refer to the implementation of the method. No repeated description is provided.

Figure 15:
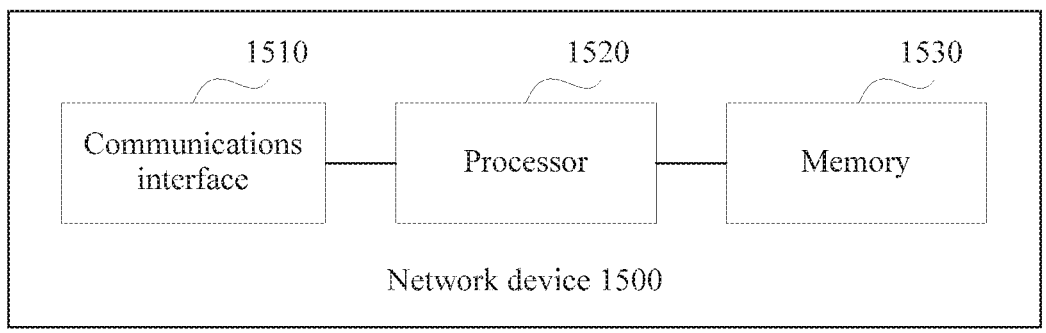
FIG. 15 is a schematic structural diagram of a network device according to an embodiment of this application.

As shown in FIG. 15, this application provides a network device 1500, configured to perform the method in the embodiment corresponding to FIG. 2. The network device herein may be a transport device, a forwarding device, a router, or a network processor. The device includes a communications interface 1510, a processor 1520, and a memory 1530. The communications interface 1510, the processor 1520, and the memory 1530 may be connected using a bus system.

The communications interface 1510 includes a plurality of ingress MAC ports and a plurality of egress MAC ports.

The memory 1530 is configured to store a program, an instruction, or code.

The processor 1520 is configured to execute the program, the instruction, or the code stored in the memory 1530, to perform the method in the embodiment corresponding to FIG. 2.

It should be understood that in this embodiment of this application, the processor 1520 may be a central processing unit (Central Processing Unit, "CPU" for short), or may be another general purpose processor, a digital signal processor (DSP), an application-specific integrated circuit (ASIC), a field programmable gate array (FPGA) or another programmable logic device, a discrete gate or a transistor logic device, a discrete hardware assembly, or the like. The general purpose processor may be a microprocessor, or the processor may be any conventional processor or the like.

The memory 1530 may include a read-only memory and a random access memory, and provide an instruction and data to the processor 1520. A part of the memory 1530 may further include a non-volatile random access memory. For example, the memory 1530 may further store information about a device type.

The bus system may further include a power bus, a control bus, a status signal bus, and the like, in addition to a data bus.

In an implementation process, steps in the method in the embodiment corresponding to FIG. 2 may be performed using an integrated logic circuit of hardware in the processor 1520 or instructions in a form of software. Steps of the packet processing method disclosed in the embodiments of this application may be directly performed by a hardware processor, or may be performed using a combination of hardware and software modules in the processor. A software module may be located in a mature storage medium in the art, such as a random access memory, a flash memory, a read-only memory, a programmable read-only memory, an electrically erasable programmable memory, a register, or the like. The storage medium is located in the memory 1530. The processor 1520 reads information in the memory 1530, and performs the steps in the method in the embodiment corresponding to FIG. 2 in combination with hardware of the processor 1520. To avoid repetition, details are not described herein again.

It should be noted that, in an example implementation, some or all of functions of the ingress processing module 1310, a function of the ingress scheduling module 1320, and a function of the forwarding processing module 1330 in FIG. 13 may be implemented using the processor 1520 in FIG. 15. Some or all of functions of the ingress processing module 1310 and some or all of functions of the egress module 1340 may be implemented using the communications interface 1510 in FIG. 15.

This application further provides a communications system, including a first network device and a second network device. The first network device may be the first network device provided in the embodiments corresponding to FIG. 13 and FIG. 15. The second network device may be the second network device provided in the embodiments corresponding to FIG. 13 and FIG. 15. The communications system is configured to perform the method in the embodiment corresponding to FIG. 2.

In conclusion, the first network device obtains, at a MAC layer, a first fragmented data frame included in a first data frame, buffers the first fragmented data frame into a first queue, obtains, at the MAC layer, a second fragmented data frame included in a second data frame, and buffers the second fragmented data frame into a second queue. The first queue is a latency-sensitive queue, and the second queue is a latency-insensitive queue. Therefore, in the method provided in this application, the first network device respectively stores obtained fragmented data frames into two different queues. The two queues are respectively corresponding to a latency-sensitive queue and a latency-insensitive queue, to ensure that a fragmented data frame in the latency-sensitive queue is preferentially processed in a subsequent processing procedure. Further, the first network device sends the first fragmented data frame to a forwarding processing module, and obtains first forwarding information using a forwarding processing module. After sending the first fragmented data frame to the forwarding processing module, the first network device sends the second fragmented data frame to the forwarding processing module, and obtains second forwarding information using the forwarding processing module. Therefore, a forwarding latency can be effectively reduced by preferentially processing a fragmented data frame in the latency-sensitive queue. The first forwarding information is forwarding information of the first data frame, and the second forwarding information is forwarding information of the second data frame.

Therefore, in the method provided in the embodiments of this application, it can be effectively ensured, at the MAC layer, that a latency-sensitive service can be sent to the forwarding processing module prior to a latency-insensitive service, to effectively reduce a forwarding latency of the latency-sensitive service in a network device. Because the latency-sensitive service and the latency-insensitive service are separately processed, it is ensured that a data frame of the latency-sensitive service is not affected by a latency-insensitive service whose data frame has a relatively great length, such that an ultra-low latency forwarding requirement is met, thereby providing better user experience.

In addition, in the method provided in this application, both the forwarding processing module and an egress module can separately perform scheduling based on the latency-sensitive service and the latency-insensitive service, and preferentially process a fragmented data frame of the latency-sensitive service, thereby further reducing the forwarding latency and improving forwarding efficiency.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

It may be clearly understood by persons skilled in the art that, for the purpose of convenient and brief description, for a detailed working process of the foregoing system, apparatus, and module, refer to a corresponding process in the foregoing method embodiments, and details are not described herein again.

All or some of the foregoing embodiments may be implemented using software, hardware, firmware, or any combination thereof. When software is used to implement the embodiments, the embodiments may be implemented wholly or partially in a form of a computer program product. The computer program product includes one or more computer instructions. When the computer program instructions are loaded and executed on the computer, the procedure or functions according to the embodiments of this application are all or partially generated. The computer may be a general purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like. Various parts in this specification are all described in a progressive manner, for same or similar parts in the embodiments, refer to these embodiments, and each embodiment focuses on a difference from other embodiments. Especially, apparatus and system embodiments are basically similar to the method embodiment, and therefore are described briefly; for related parts, refer to partial descriptions in the method embodiment.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general purpose computer, a dedicated computer, an embedded processor, or a processor of any other programmable data processing device to generate a machine, such that the instructions executed by a computer or a processor of any other programmable data processing device generate an apparatus for implementing a function in one or more processes in the flowcharts and/or in one or more blocks in the block diagrams.

These computer program instructions may be stored in a computer readable memory that can instruct the computer or any other programmable data processing device to work in a specific manner, such that the instructions stored in the computer readable memory generate an artifact that includes an instruction apparatus. The instruction apparatus implements a function in one or more processes in the flowcharts and/or in one or more blocks in the block diagrams.

These computer program instructions may be loaded onto a computer or another programmable data processing device, such that a series of operations and steps are performed on the computer or the other programmable device, thereby generating computer-implemented processing. Therefore, the instructions executed on the computer or the other programmable device provide steps for implementing a function in one or more processes in the flowcharts and/or in one or more blocks in the block diagrams.

Although the embodiments of this application are described, persons skilled in the art can make changes and modifications to these embodiments once they learn the basic inventive concept. Therefore, the appended claims are intended to be construed as covering the embodiments and all changes and modifications falling within the scope of this application.

The foregoing descriptions are merely example implementations of the present disclosure, but are not intended to limit the protection scope of the present disclosure. Any variation or replacement readily figured out by persons skilled in the art within the technical scope disclosed in the present disclosure shall fall within the protection scope of the present disclosure. Therefore, the protection scope of the present disclosure shall be subject to the protection scope of the claims.

What is claimed is:

1. A packet processing method by a first network device, the method comprising:
    obtaining, at a Medium Access Control (MAC) layer, a first fragmented data frame comprised in a first data frame;
    obtaining frame information carried in the first fragmented data frame when the first fragmented data frame is an initial fragmented data frame of the first data frame;
    querying a data frame forwarding information table based on the frame information to obtain first forwarding information of the first data frame when the first fragmented data frame is an initial fragmented data frame of the first data frame;
    adding the first forwarding information to a fragmented data frame forwarding information table when the first fragmented data frame is an initial fragmented data frame of the first data frame,
    querying the fragmented data frame forwarding information table to obtain first forwarding information of the first data frame when the first fragmented data frame is not the initial fragmented data frame of the first data frame;
    buffering the first fragmented data frame into a latency-sensitive first queue responsive to the first fragmented data frame being a latency-sensitive fragmented data frame;
    obtaining, at the MAC layer, a second fragmented data frame comprised in a second data frame;
    buffering the second fragmented data frame into a latency-insensitive second queue responsive to the second fragmented data frame being a latency-insensitive fragmented data frame;
    scheduling the first fragmented data frame prior to the second fragmented data frame to perform forwarding processing on the first fragmented data frame; and
    scheduling, after scheduling the first fragmented data frame, the second fragmented data frame to perform forwarding processing on the second fragmented data frame.

2. The packet processing method according to claim 1, wherein obtaining, at the MAC layer, the first fragmented data frame comprised in the first data frame comprises receiving, using a first ingress MAC port, the first fragmented data frame that carries a latency-sensitive label.

3. The packet processing method according to claim 1, wherein obtaining, at the MAC layer, the first fragmented data frame comprised in the first data frame comprises:
    receiving, the first data frame using a first ingress MAC port; and
    fragmenting the first data frame to obtain the first fragmented data frame, wherein the first ingress MAC port is configured to be bound to receive a latency-sensitive data frame.

4. The packet processing method according to claim 3, wherein the first fragmented data frame comprises a latency-sensitive label.

5. The packet processing method according to claim 3, wherein fragmenting the first data frame to obtain the first fragmented data frame comprises:
    reading the first data frame based on a first preset packet length to obtain an initial fragmented data frame of the first data frame when a length of the first data frame is greater than or equal to a first preset threshold, wherein the initial fragmented data frame of the first data frame carries an initial fragmented data frame identifier and a fragmented data frame home identifier;
    determining, by the first network device after obtaining the initial fragmented data frame, whether a length of remaining data of the first data frame is greater than or equal to a second preset threshold; and
    reading the remaining data of the first data frame to obtain an intermediate fragmented data frame of the first data frame when the length of the remaining data of the first data frame is greater than or equal to the second preset threshold, wherein reading the remaining data of the first data frame is based on a second preset packet length, wherein the intermediate fragmented data frame of the first data frame carries an intermediate fragmented data frame identifier and the fragmented data frame home identifier; or using the remaining data of the first data frame as a last fragmented data frame of the first data frame when the length of the remaining data of the first data frame is less than the second preset threshold, wherein the last fragmented data frame of the first data frame carries a last fragmented data frame identifier and the fragmented data frame home identifier, wherein the first fragmented data frame is one of the initial fragmented data frame of the first data frame, the intermediate fragmented data frame of the first data frame, or the last fragmented data frame of the first data frame.

6. The packet processing method according to claim 1, wherein querying the fragmented data frame forwarding information table comprises using a fragmented data frame home identifier carried in the first fragmented data frame as a keyword.

7. The packet processing method according to claim 1, further comprising transparently transmitting the first fragmented data frame to a second network device.

8. The packet processing method according to claim 1, further comprising:
buffering the first fragmented data frame;
reassembling all of the fragmented data frames comprised in the first data frame after all fragmented data frames comprised in the first data frame are buffered;
obtaining a reassembled first data frame based on reassembling all of the fragmented data frames; and
sending the reassembled first data frame to a second network device.

9. The packet processing method according to claim 1, wherein obtaining, at the MAC layer, the second fragmented data frame comprised in the second data frame comprises receiving, using a second ingress MAC port, the second fragmented data frame that carries a latency-insensitive label.

10. The packet processing method according to claim 1, wherein obtaining, at the MAC layer, the second fragmented data frame comprised in the second data frame comprises:
receiving, the second data frame using a second ingress MAC port; and
fragmenting the second data frame to obtain the second fragmented data frame.

11. A packet processing apparatus, comprising:
a communications interface;
a processor coupled to the communications interface, wherein the processor is configured to:
obtain, at a Medium Access Control (MAC) layer, a first fragmented data frame comprised in a first data frame;
obtain frame information carried in the first fragmented data frame when the first fragmented data frame is an initial fragmented data frame of the first data frame;
query a data frame forwarding information table based on the frame information to obtain first forwarding information of the first data frame when the first fragmented data frame is an initial fragmented data frame of the first frame;
add the first forwarding information to a fragmented data frame forwarding information table when the first fragmented data frame is an initial fragmented data frame of the first data frame,
query the fragmented data frame forwarding information table to obtain first forwarding information of the first data frame when the first fragmented data frame is not the initial fragmented data frame of the first data frame;
buffer the first fragmented data frame into a latency-sensitive first queue responsive to the first fragmented data frame being a latency-sensitive fragmented data frame;
obtain, at the MAC layer, a second fragmented data frame comprised in a second data frame;
buffer the second fragmented data frame into a latency-insensitive second queue responsive to the second fragmented data frame being a latency-insensitive fragmented data frame;
schedule the first fragmented data frame prior to the second fragmented data frame to perform forwarding processing on the first fragmented data frame; and
schedule the second fragmented data frame to perform forwarding processing on the second fragmented data frame after scheduling the first fragmented data frame.

12. The packet processing apparatus according to claim 11, wherein the communications interface comprises a first ingress MAC port, and wherein the first ingress MAC port is configured to receive the first fragmented data frame that carries a latency-sensitive label.

13. The packet processing apparatus according to claim 11, wherein the communications interface comprises a first ingress MAC port, wherein the first ingress MAC port is configured to receive the first data frame and perform fragmenting processing on the first data frame to obtain the first fragmented data frame, and wherein the first ingress MAC port is configured to be bound to receive a latency-sensitive data frame.

14. The packet processing apparatus according to claim 13, wherein the first fragmented data frame comprises a latency-sensitive label.

15. The packet processing apparatus according to claim 11,
wherein the processor queries the fragmented data frame forwarding information table using a fragmented data frame home identifier carried in the first fragmented data frame as a keyword.

16. The packet processing apparatus according to claim 11, wherein the communications interface is configured to transparently transmit the first fragmented data frame to a second network device.

17. The packet processing apparatus according to claim 11, wherein communications interface is configured to:
buffer the first fragmented data frame;
reassemble all of the fragmented data frames comprised in the first data frame after all fragmented data frames comprised in the first data frame are buffered;
obtain a reassembled first data frame based on reassembling all of the fragmented data frames; and
send the reassembled first data frame to a second network device.

18. The packet processing apparatus according to claim 11, wherein the communications interface comprises a second ingress MAC port, and wherein the second ingress MAC port is configured to receive the second fragmented data frame that carries a latency-insensitive label.

19. The packet processing apparatus according to claim 11, wherein the communications interface comprises a second ingress MAC port, and wherein the second ingress MAC port is configured to receive the second data frame and perform fragmenting processing on the second data frame to obtain the second fragmented data frame.

20. A communications system, comprising:

a packet processing apparatus configured to:

obtain, at a Medium Access Control (MAC) layer, a first fragmented data frame comprised in a first data frame;

obtain frame information carried in the first fragmented data frame when the first fragmented data frame is an initial fragmented data frame of the first data frame;

query a data frame forwarding information table based on the frame information to obtain first forwarding information of the first data frame when the first fragmented data frame is an initial fragmented data frame of the first data frame, add the first forwarding information to a fragmented data frame forwarding information table when the first fragmented data frame is an initial fragmented data frame of the first data frame, query the fragmented data frame forwarding information table to obtain first forwarding information of the first data frame when the first fragmented data frame is not the intimal fragmented data frame of the first data frame;

buffer the first fragmented data frame into a latency-sensitive first queue responsive to the first fragmented data frame being a latency-sensitive fragmented data frame;

obtain, at the MAC layer, a second fragmented data frame comprised in a second data frame;

buffer the second fragmented data frame into a latency-insensitive second queue responsive to the second fragmented data frame being a latency-insensitive fragmented data frame;

schedule the first fragmented data frame prior to the second fragmented data frame to perform forwarding processing on the first fragmented data frame; and schedule the second fragmented data frame to perform forwarding processing on the second fragmented data frame after scheduling the first fragmented data frame.

* * * * *

UNITED STATES PATENT AND TRADEMARK OFFICE
CERTIFICATE OF CORRECTION

PATENT NO. : 11,218,572 B2
APPLICATION NO. : 16/539542
DATED : January 4, 2022
INVENTOR(S) : Yunlei Qi, Chunrong Li and Yongjian Hu Page 1 of 1

It is certified that error appears in the above-identified patent and that said Letters Patent is hereby corrected as shown below:

In the Claims

Claim 20, Column 32, Line 2: "not the intimal fragmented" should read "not the initial fragmented"

Signed and Sealed this
Twenty-second Day of February, 2022

Drew Hirshfeld
*Performing the Functions and Duties of the
Under Secretary of Commerce for Intellectual Property and
Director of the United States Patent and Trademark Office*